US008527355B2

(12) United States Patent
Milone et al.

(10) Patent No.: US 8,527,355 B2
(45) Date of Patent: Sep. 3, 2013

(54) METHOD AND SYSTEM FOR REQUESTING PRIOR ART FROM THE PUBLIC IN EXCHANGE FOR A REWARD

(75) Inventors: Cheryl Milone, New York, NY (US); Steven Brian Powell, New York, NY (US)

(73) Assignee: Article One Partners Holdings, LLC, New York, NY (US)

( * ) Notice: Subject to any disclaimer, the term of this patent is extended or adjusted under 35 U.S.C. 154(b) by 1233 days.

(21) Appl. No.: 12/058,653

(22) Filed: Mar. 28, 2008

(65) Prior Publication Data
US 2008/0270255 A1    Oct. 30, 2008

Related U.S. Application Data

(63) Continuation of application No. 11/933,343, filed on Oct. 31, 2007, now abandoned.

(60) Provisional application No. 60/920,395, filed on Mar. 28, 2007.

(51) Int. Cl.
*G06Q 30/00* (2012.01)
(52) U.S. Cl.
USPC ............... 705/26.1; 705/27.1; 705/310
(58) Field of Classification Search
USPC ............... 705/26, 27, 26.1, 27.1, 310
See application file for complete search history.

(56) References Cited

U.S. PATENT DOCUMENTS

| | | | |
|---|---|---|---|
| 4,571,669 A | 2/1986 | Tsujii | |
| 4,751,669 A | 6/1988 | Sturgis et al. | |
| 4,827,508 A | 5/1989 | Shear | |
| 5,083,784 A | 1/1992 | Nilssen | |
| 5,754,840 A | 5/1998 | Rivette et al. | |
| 5,799,287 A | 8/1998 | Dembo et al. | |
| 5,816,918 A | 10/1998 | Kelly et al. | |
| 5,862,223 A | 1/1999 | Walker et al. | |
| 5,885,158 A | 3/1999 | Torango et al. | |
| 5,924,072 A | 7/1999 | Havens | |
| 5,987,464 A | 11/1999 | Schneider | |

(Continued)

FOREIGN PATENT DOCUMENTS

| | | |
|---|---|---|
| EP | 0955071 | 11/1999 |
| EP | 1139257 | 10/2001 |

(Continued)

OTHER PUBLICATIONS

"BountyQuest Lauches First Internet Destination Offering Large Cash Rewards for Vital Information; Bounties Starting at $10,000 Will Help Settle High-Stakes Patent Disputes; Site Backers Include Jeff Bezos and Tim O'Reilly," PR Newswire, Oct. 18, 2000.*

(Continued)

*Primary Examiner* — Jeffrey A Smith
*Assistant Examiner* — Anne Georgalas
(74) *Attorney, Agent, or Firm* — Schwegman Lundberg & Woessner, P.A.

(57) ABSTRACT

The present invention is a method and system for requesting from at least one member of the public, information that teaches or describes a technology, or a technology covered by one or more claims of a patent, in exchange for a reward where the information received can be combined with an investment strategy and/or auctioned.

26 Claims, 26 Drawing Sheets

(56) References Cited

U.S. PATENT DOCUMENTS

| | | | |
|---|---|---|---|
| 5,991,751 A | 11/1999 | Rivette et al. | |
| 5,991,780 A | 11/1999 | Rivette et al. | |
| 5,999,907 A | 12/1999 | Donner et al. | |
| 6,018,714 A | 1/2000 | Risen, Jr. et al. | |
| 6,018,722 A | 1/2000 | Ray et al. | |
| 6,038,561 A | 3/2000 | Snyder et al. | |
| 6,131,085 A | 10/2000 | Rossides | |
| 6,157,947 A | 12/2000 | Watanabe et al. | |
| 6,233,428 B1 | 5/2001 | Fryer | |
| 6,257,896 B1 | 7/2001 | Fargano | |
| 6,263,314 B1 | 7/2001 | Donner | |
| 6,339,767 B1 | 1/2002 | Rivette et al. | |
| 6,371,855 B1 | 4/2002 | Gavriloff et al. | |
| 6,401,118 B1 | 6/2002 | Thomas | |
| 6,452,613 B1 | 9/2002 | Lefebvre et al. | |
| 6,468,159 B1 | 10/2002 | La Mura et al. | |
| 6,546,230 B1 | 4/2003 | Allison | |
| 6,556,992 B1 | 4/2003 | Barney et al. | |
| 6,565,442 B2 | 5/2003 | La Mura et al. | |
| 6,594,640 B1 | 7/2003 | Postrel | |
| 6,606,608 B1 | 8/2003 | Bezos | |
| 6,651,056 B2 | 11/2003 | Price et al. | |
| 6,658,401 B2 * | 12/2003 | Utsumi et al. | 1/1 |
| 6,658,467 B1 | 12/2003 | Rice et al. | |
| 6,665,656 B1 | 12/2003 | Carter | |
| 6,694,331 B2 | 2/2004 | Lee | |
| 6,721,793 B1 | 4/2004 | Corless | |
| 6,773,350 B2 | 8/2004 | Yoshimi et al. | |
| 6,856,986 B1 | 2/2005 | Rossides | |
| 6,915,268 B2 | 7/2005 | Riggs et al. | |
| 6,997,717 B2 | 2/2006 | Kienzle et al. | |
| 7,058,602 B1 | 6/2006 | La Mura et al. | |
| 7,082,399 B2 | 7/2006 | Utsumi et al. | |
| 7,085,740 B1 | 8/2006 | Meyers | |
| 7,110,970 B2 | 9/2006 | Dingman et al. | |
| 7,117,202 B1 | 10/2006 | Willoughby | |
| 7,149,716 B2 | 12/2006 | Gatto | |
| 7,171,383 B2 | 1/2007 | Johnson et al. | |
| 7,219,071 B2 | 5/2007 | Gallagher | |
| 7,228,287 B1 | 6/2007 | Samson et al. | |
| 7,269,572 B2 | 9/2007 | Morrow | |
| 7,991,624 B2 | 8/2011 | Milone | |
| 2001/0021923 A1 * | 9/2001 | Atkinson et al. | 705/37 |
| 2001/0034680 A1 | 10/2001 | Purcell | |
| 2001/0049654 A1 | 12/2001 | Cecchetti et al. | |
| 2001/0053513 A1 | 12/2001 | Corn et al. | |
| 2002/0002474 A1 | 1/2002 | Michelson et al. | |
| 2002/0002524 A1 | 1/2002 | Kossovsky et al. | |
| 2002/0007334 A1 | 1/2002 | Dicks et al. | |
| 2002/0013176 A1 | 1/2002 | Yoshimi et al. | |
| 2002/0022974 A1 | 2/2002 | Lindh | |
| 2002/0040365 A1 | 4/2002 | Price et al. | |
| 2002/0046038 A1 | 4/2002 | Prokoski | |
| 2002/0049721 A1 | 4/2002 | Utsumi et al. | |
| 2002/0052778 A1 | 5/2002 | Murphy et al. | |
| 2002/0059201 A1 | 5/2002 | Work | |
| 2002/0087496 A1 | 7/2002 | Stirpe et al. | |
| 2002/0103654 A1 * | 8/2002 | Poltorak | 705/1 |
| 2002/0107709 A1 | 8/2002 | Colson et al. | |
| 2002/0110795 A1 | 8/2002 | Lemchen | |
| 2002/0116247 A1 | 8/2002 | Tucker et al. | |
| 2002/0165730 A1 | 11/2002 | Matsuda | |
| 2002/0165818 A1 | 11/2002 | Meade, II | |
| 2002/0169701 A1 | 11/2002 | Tarbox et al. | |
| 2002/0169743 A1 | 11/2002 | Arnold et al. | |
| 2002/0184044 A1 | 12/2002 | Reader | |
| 2002/0198782 A1 * | 12/2002 | Shorter | 705/14 |
| 2003/0028460 A1 | 2/2003 | Kraemer | |
| 2003/0028469 A1 | 2/2003 | Bergman | |
| 2003/0074559 A1 | 4/2003 | Riggs | |
| 2003/0105706 A1 | 6/2003 | Stanglmayr | |
| 2003/0110215 A1 | 6/2003 | Joao | |
| 2003/0125978 A1 | 7/2003 | Paradiso | |
| 2003/0144877 A1 | 7/2003 | Goldmann et al. | |
| 2003/0149780 A1 | 8/2003 | Inoue et al. | |
| 2003/0163337 A1 | 8/2003 | Kasten | |
| 2003/0195834 A1 | 10/2003 | Hillis et al. | |
| 2003/0212572 A1 | 11/2003 | Poltorak | |
| 2004/0073443 A1 | 4/2004 | Gabrick et al. | |
| 2004/0093261 A1 | 5/2004 | Jain et al. | |
| 2004/0128224 A1 | 7/2004 | Dabney et al. | |
| 2004/0181427 A1 | 9/2004 | Stobbs et al. | |
| 2004/0186738 A1 | 9/2004 | Reisman | |
| 2004/0205015 A1 | 10/2004 | Delacruz | |
| 2004/0220842 A1 | 11/2004 | Barney | |
| 2004/0234057 A1 | 11/2004 | Kaye | |
| 2004/0243437 A1 | 12/2004 | Grace et al. | |
| 2004/0261011 A1 | 12/2004 | Stuckman et al. | |
| 2005/0091100 A1 | 4/2005 | Riggs et al. | |
| 2005/0108172 A1 * | 5/2005 | Pet | 705/57 |
| 2005/0144081 A1 | 6/2005 | Guler et al. | |
| 2005/0203824 A1 | 9/2005 | Freud et al. | |
| 2005/0204048 A1 | 9/2005 | Pujol et al. | |
| 2005/0288984 A1 | 12/2005 | Hamilton | |
| 2006/0015392 A1 | 1/2006 | Talla et al. | |
| 2006/0026146 A1 | 2/2006 | Tvito | |
| 2006/0041476 A1 | 2/2006 | Zheng | |
| 2006/0041491 A1 | 2/2006 | Smith et al. | |
| 2006/0042483 A1 | 3/2006 | Work et al. | |
| 2006/0080326 A1 | 4/2006 | Akbay et al. | |
| 2006/0082068 A1 | 4/2006 | Patchen | |
| 2006/0085220 A1 | 4/2006 | Frank et al. | |
| 2006/0085249 A1 | 4/2006 | Diaz et al. | |
| 2006/0100942 A1 | 5/2006 | Williams | |
| 2006/0100948 A1 * | 5/2006 | Millien et al. | 705/35 |
| 2006/0106675 A1 | 5/2006 | Cohen et al. | |
| 2006/0106774 A1 | 5/2006 | Cohen et al. | |
| 2006/0106788 A1 | 5/2006 | Forrest | |
| 2006/0116909 A1 | 6/2006 | Grace et al. | |
| 2006/0136305 A1 | 6/2006 | Fitzsimmons et al. | |
| 2006/0155572 A1 | 7/2006 | Postrel | |
| 2006/0190275 A1 | 8/2006 | Dupree et al. | |
| 2006/0190807 A1 | 8/2006 | Tran | |
| 2006/0218009 A1 | 9/2006 | Grace et al. | |
| 2006/0218101 A1 | 9/2006 | Kim | |
| 2006/0224509 A1 | 10/2006 | Walker et al. | |
| 2006/0224510 A1 | 10/2006 | Walker et al. | |
| 2006/0229916 A1 | 10/2006 | Michelson et al. | |
| 2006/0265259 A1 | 11/2006 | Diana et al. | |
| 2006/0288087 A1 | 12/2006 | Sun | |
| 2007/0043642 A1 | 2/2007 | Smith et al. | |
| 2007/0055610 A1 | 3/2007 | Palestrant et al. | |
| 2007/0055611 A1 | 3/2007 | Palestrant et al. | |
| 2007/0055612 A1 | 3/2007 | Palestrant et al. | |
| 2007/0061217 A1 | 3/2007 | Palestrant et al. | |
| 2007/0061218 A1 | 3/2007 | Palestrant et al. | |
| 2007/0061219 A1 | 3/2007 | Palestrant et al. | |
| 2007/0073561 A1 | 3/2007 | Malackowski et al. | |
| 2007/0088673 A1 | 4/2007 | Vock | |
| 2007/0088743 A1 | 4/2007 | Kikuchi et al. | |
| 2007/0094117 A1 | 4/2007 | Masuyama et al. | |
| 2007/0094291 A1 | 4/2007 | Masuyama et al. | |
| 2007/0100724 A1 | 5/2007 | Hollas et al. | |
| 2007/0106544 A1 | 5/2007 | Burth | |
| 2007/0136116 A1 | 6/2007 | Germeraad et al. | |
| 2007/0136271 A1 | 6/2007 | Masuyama et al. | |
| 2007/0150298 A1 | 6/2007 | Barney | |
| 2007/0150510 A1 | 6/2007 | Masuyama et al. | |
| 2007/0150544 A1 | 6/2007 | Jachner | |
| 2007/0156443 A1 | 7/2007 | Gurvey | |
| 2007/0174244 A1 | 7/2007 | Jones | |
| 2007/0192463 A1 | 8/2007 | Kaplan | |
| 2007/0198345 A1 | 8/2007 | Park | |
| 2007/0208653 A1 | 9/2007 | Murphy | |
| 2007/0208669 A1 | 9/2007 | Rivette et al. | |
| 2007/0219794 A1 | 9/2007 | Park et al. | |
| 2007/0219795 A1 | 9/2007 | Park et al. | |
| 2007/0219863 A1 | 9/2007 | Park et al. | |
| 2007/0219958 A1 | 9/2007 | Park et al. | |
| 2007/0219967 A1 | 9/2007 | Mueller et al. | |
| 2007/0220041 A1 | 9/2007 | Van Luchene et al. | |
| 2007/0244837 A1 | 10/2007 | Plow et al. | |
| 2007/0250483 A1 | 10/2007 | Blue et al. | |
| 2007/0250585 A1 | 10/2007 | Ly et al. | |

| | | | |
|---|---|---|---|
| 2007/0259325 | A1 | 11/2007 | Clapper |
| 2007/0294232 | A1 | 12/2007 | Gibbs et al. |
| 2008/0137550 | A1 | 6/2008 | Jurca et al. |

FOREIGN PATENT DOCUMENTS

| | | |
|---|---|---|
| EP | 1156439 | 11/2001 |
| EP | 1617360 | 1/2006 |
| EP | 1802080 | 6/2007 |
| JP | 2000268111 A | 9/2000 |
| JP | 2006268111 A | 9/2000 |
| WO | WO 0050967 A2 * | 8/2000 |
| WO | WO-0131538 | 5/2001 |
| WO | WO-0131538 A1 | 5/2001 |
| WO | WO 0223374 A2 * | 3/2002 |
| WO | WO-02065369 | 8/2002 |
| WO | WO-03073336 | 9/2003 |
| WO | WO-2005031623 | 4/2005 |
| WO | WO-2005098675 | 10/2005 |
| WO | WO-2006029149 | 3/2006 |
| WO | WO-2006029149 A2 | 3/2006 |
| WO | WO-2006041865 | 4/2006 |
| WO | WO-2006055491 | 5/2006 |
| WO | WO-2006055636 | 5/2006 |
| WO | WO-2007047545 | 4/2007 |
| WO | WO-2007084847 | 7/2007 |
| WO | WO-2007094783 | 8/2007 |
| WO | WO-2007106058 | 9/2007 |
| WO | WO-2008119083 A1 | 10/2008 |

OTHER PUBLICATIONS

Wade Roush, Reintermediation, For the legions of Internet Users contributing to new "human-assisted search" sites, no job is too small, Technology Review, May/Jun. 2007, pp. 92-93.

Lemley, et al., Probabilistic Patents, Journal of Economic Perspectives; Spring2005, vol. 19 Issue 2, p. 75-98, 24p.

Gregory, Gwen M., BountyQuest Awards $40,000 for Information Challenging Patent Validity, Information Today, http://www.infotoday.com, Mar. 2001, pp. 58-59.

Patent Specific Organizations from Encyclopedia of Associations, http://galenet.gale.com/a/acp/netacgi/nph-brs?d=GRRS&s1=0. GRRO.&s2=8,s3=patent&1 . . . as saved Nov. 9, 2007.

List of Patent Specific Organizations and Publications from Gale, http://galenet.gale.com/a/acp/netacgi/nph-brs?d=GRRS&S1=0. GRRO.&S2=&s3+patent&1 . . . as saved on Nov. 9, 2007.

Jessie Seyfer, Taste for the exotic; Intellectual Property; Flush with cash, private equity and hedge funds are venturing into the rarified world of patents, Palm Beach Daily Business Review, vol. 53; Issue 190 Jul. 6, 2007.

Jessie Seyfer, Private equity helps fuel IP wars: And hedge funds figure out how to turn patents into securities; NEWS, The Recorder, vol. 131st YearÅ Å 125 www.callaw.com $2.00; Issue 125, Jun. 28, 2007.

US Fed News, Georgia Inventors Develop Adaptive Control System with Hedge Unit, US Fed News, May 22, 2007.

John Bringardner, Spies in the courtroom; Litigation; Betting on high-stakes patent trials is the latest way to make a buck, Palm Beach Daily Business Review, vol. 53; Issue 153, May 14, 2007.

Nathan Vardi, Patent Pirates; Hedge funds and institutional investors are financing the latest wave of IP lawsuits, Forbes, vol. 179 Issue 10, May 7, 2007.

Kalow, et al., Outside Counsel; News; Early Is Better Than Late for Strategizing Your Patents, New York Law Journal, p. 4, col. 3, vol. 236; Issue 121, Dec. 26, 2006.

Market Wire, Is Patent Litigation Worth the Headaches? Wolf Greenfield Lawyers Explore the Issues, (c) Copyright 2006 Market Wire, Inc., Dec. 13, 2006.

Lori Pizzani, Firm Offers Auction' Investment Method, Money Management Executive, Dec. 4, 2006.

William Hoffman, Reverse Logistics Patent May Stir Up Industry, Pacific Shipper, Sep. 21, 2006.

William Hoffman, Reverse Logistics, Patented, Traffic World, Sep. 18, 2006.

Ocean Tomo Fall 2006 Live Intellectual Property Auction Catalogue Now Available, Publication Summarizes Information for 275+ Intellectual Property Assets Offered by Fortune 500(R) Companies, Sophisticated Investors and Top Professional Inventors, 19:44 GMT, Aug. 28, 2006.

Sloan, Paul, The Patent Machine, Business 2.0, vol. 7; Issue 6; ISSN: 15381730, Jul. 1, 2006.

Brenda Sapino Jeffreys, Trolling for Patents at a Live Auction; News, Texas Lawyer, vol. 22; Issue 05, Apr. 3, 2006.

Beth Davidz New way to sell inventions discovered First patent auction raises some concerns, Medill News Service, Chicago Daily Herald, Mar. 16, 2006.

New Firm Simplifies Operations for Small Hedge Funds, VanthedgePoint Debuts Specialized Services Platform, 13:57 GMT, PR Newswire (U.S.), Jan. 30, 2006.

Voracious venture, The Economist, Oct. 22, 2005.

Christine Williamson, Classifying performance: Firms take different approaches to answer hedge fund questions, Pensions & Investments, vol. 32; No. 24, Nov. 29, 2004.

Rick Miller Firm seeks patent for its hedge fund strategy : But some question whether IRS will give it the nod, Crain News Service, Crain's Chicago Business, vol. 23 No. 41, Oct. 2, 2000.

Jessie Seyfer, Taste for the exotic: Intellectual Property; Flush with cash, private equity and hedge funds are venturing into the rarified world of patents, Miami Daily Business Review, vol. 53; Issue 190 Jul. 6, 2007.

Jessie Seyfer, Taste for the exotic; Intellectual Property; Flush with cash, private equity and hedge funds are venturing into the rarified world of patents, Broward Daily Business Review, vol. 53; Issue 190 Jul. 6, 2007.

"International Application Serial No. PCT/US2008/058794, International Preliminary Report on Patentability mailed Sep. 29, 2009", 14 pgs.

"International Application Serial No. PCT/US2008/058794, International Search Report mailed Aug. 1, 2008", 1 pg.

"International Application Serial No. PCT/US2008/058794, Written Opinion mailed Aug. 1, 2008", 13 pgs.

Jessie, Seyfer, "Taste for the exotic; Intellectual Property", Flush with cash, private equity and hedge funds are venturing into the rarified world of patents, Miami Daily Business Review, vol. 53; Issue 190, (Jul. 6, 2007).

Jessie, Seyfer, "Taste for the exotic; Intellectual Property", Flush with cash, private equity and hedge funds are venturing into the rarified world of patents, Broward Daily Business Review, vol. 53; Issue 190, (Jul. 6, 2007).

"U.S. Appl. No. 11/933,362, 312 Amendment filed Oct. 6, 2010", 4 pgs.

"U.S. Appl. No. 11/933,362, Non Final Office Action mailed Dec. 4, 2009", 14 pgs.

"U.S. Appl. No. 11/933,362, Notice of Allowance mailed Mar. 31, 2011", 7 pgs.

"U.S. Appl. No. 11/933,362, Notice of Allowance mailed Sep. 30, 2010", 8 pgs.

"U.S. Appl. No. 11/933,362, PTO Response to 312 Amendment mailed Oct. 21, 2010", 2 pgs.

"U.S. Appl. No. 11/933,362, Response filed Jun. 4, 2010 to Non Final Office Action mailed Dec. 4, 2009", 9 pgs.

"Community Patent Review Project Summary", New York Law School Institute for Information Law & Policy., [online] Retrieved From Internet: <http://dotank.nyls.edu/communitypatent/>, 3 pgs, Date Unknown.

"Cryptographic Challenges: The RSA Laboratories Secret—Key Challenge", (c) 2012 EMC Corporation, (Jan. 28, 2007), 2 pgs.

"Fairness Interviews", [Online] Retrieved From Internet: <www.Interviews.Fairness.com>, (Oct. 2000), 5 pgs.

"General questions/answers about Patent Busting Forum", Access Patent Group, LLC., [online]. [archived on Aug. 13, 2006]. Retrieved from the Internet: <URL: http://web.archive.org/web/20060813170246/http://www.accesspatentgroup.com/article. asp?aid=152&iid=30&sud=45>, (Feb. 27, 2005), 3 pgs.

"P&G Technology Transfer", [online] [archived on Mar. 9, 2004]. Retrieved From Internet: <http://web.archive.org/web/20040403234657/http://pg. t2h.yet2.com/t2h/p./homepage>, (2004), 1 pg.

"P&G Technology Transfer FAQ", [online] [archived on Apr. 11, 2004]. Retrieved From the Internet: http://web.archive.org/web/20040411130154/http://pg.t2h.yet2.com/t2h/page/faq, (2004), 2 pgs.

"Patent reform and third party submission of art: a proposed solution", [online] [archived May 7, 2005]. Retrieved From Internet: <http://web.archive.org/web/20050507031726/http://promotetheprogress.com/>, (Apr. 28, 2005), 11 pgs.

"Pilot Concerning Public Submission of Peer Reviewed Prior Art", Official Gazette Notice, (Jun. 26, 2007), 6 pgs.

"RentACoder", [online] [archived on Jan. 11, 2007]. Retrieved From the Internet: http://web.archive.org/web/20070111121732/http://www.rentacoder.com/RentACoder/default.asp, (2007), 1 pg.

"Spreadshirt", [online] [archived on Jan. 2, 2007]. Retrieved From Internet: <http://web.archive.org/web/20070102182609/www.spreadshirt.net/?lang=en&locale=GB>, (2007), 1 pg.

"Staples(r) Invention Quest", [Online] [archived Jan. 4, 2007]. Retrieved From the Internet: <http://web.archive.org/web/20070104043104/http://inventionquest.dja.com/>, (Jan. 4, 2007), 1 pg.

"The Rules-RSA Challenges are no longer active", (Jan. 28, 1997), 1 pg.

"Threadless", [online] [archived on Jan. 2, 2007]. Retrieved From Internet: <http://web.archive.org/web/20070102034935/www.threadless.com/help>, (Jan. 2, 2007), 6 pgs.

"TopCoder", [online] [archived on Jan 1, 2006]. Retrieved From Internet: <URL: http://web.archive.org/web/20060101045331/http://www.topcoder.com>, (Jan. 1, 2006), 1 pg.

"Venture2", [online] [archived on Feb. 14, 2007]. Retrieved From the Internet: <URL: http://web.archive.org/web/20070214074315/http://www.venture2.net/>, (Feb. 14, 2007), 1 pg.

"Verhaert", [online] [archived on Jan. 31, 2006]. Retrieved From Internet: <URL: http://web.archive.org/web/20061231073917/http://www.verhaert.com/>, (Dec. 31, 2006), 1 pg.

"Wilogo", [online] [archived Oct. 22, 2006]. Retrieved From the Internet: <http://web.archive.org/web/20061022061807/http://en.wilogo.com/>, (2006), 2 pgs.

"www.bountyquest.com", (c) 2001 BountyQuest Corp., [online]. [archived on Feb. 2, 2003]. Retrieved From the Internet: <URL: http://web.archive.org/web/20030202064932/http://bountyquest.com/., (2001), 2 pgs.

"X Prize", [online] [archived on Jan. 1, 2007]. Retrieved From the Internet: <URL: http://web.archive.org/web/20070101023418/http://www.xprize.org/>, (Jan. 1, 2007), 1 pg.

"yet2.com tm Website", (c) 1999-2001 yet2.com, [online] [archived on Apr. 5, 2001]. Retrieved From the Internet: <URL: http://web.archive.org/web/20010405070559/http://www.yet2.com/PSUser/y2_home.htm>, (Apr. 5, 2001), 1 pg.

"yet2.com to Establish Forum for the Exchange of Technology", [Online] Retrieved From Internet: <www.Yet2.com>, (Aug. 10, 1999).

"YourEncore", [online] [archived on Dec. 2, 2003]. Retrieved From the Internet: <URL: http://web.archive.org/web/20031202155620/http://www.yourencore.com/>, (2003), 1 pg.

Besaha, Bob, "Bounty Hunting in the Patent Base", Communications of the ACM, 46(3), (2003), 27-29.

Cave, Damien, "Who ya gonna call? Patent Busters!", [online] Retrieved From the Internet: <URL: http://www.salon.com/2000/10/23/cella/>, (Oct. 23, 2000), 7 pgs.

Diener, Kathleen, et al., "The Market for Open Innovation: Increasing the Efficiency and Effectiveness of the Innovation Process.", RWTH TIM Group, [Online] Retrieved From Internet: <www.lulu.com>, (Jan. 2010), 41 pgs.

Noveck, Beth Simone, ""Peer to Patent": Collective Intelligence, Open Review, and Patent Reform", Harvard Journal of Law & Technology vol. 20, No. 1, (Fall 2006), 123-161.

Varchaver, Nicholas, "Patent review goes Wiki.", Fortune Magazine., [Online] Retrieved From Internet: <http://money.cnn.com/magazines/fortune/fortune_archive/2006/08/21/8383639/index.htm>, Aug. 16, 2006, 2 pgs.

Walker, Ruth, "Whose idea is it, anyway? 'Bounty hunters' track the validity of patents", The Christian Science Monitor., (Jan. 17, 2002), 2 pgs.

"U.S. Appl. No. 11/933,362, Notice of Allowance, mailed Mar. 31, 2011", 7 pgs.

"U.S. Appl. No. 11/933,362 Response filed Jun. 4, 2010 to Non Final Office Action mailed Dec. 4, 2009", 9 pgs.

"Community Patent Review Project Summary", New York Law School Institute for Information Law & Policy, [online] [retrieved Mar. 5, 2013]. Retrieved from the Internet: <http://dotank.nyls.edu/communitypatent/>, (2013) 3 pgs.

"Cryptographic Challenges: The RSA Laboratories Secret—Key Challenge", ©2012 EMC Corporation, (Jan. 28, 2007), 2 pgs.

"Fairness Interviews", [online]. Retrieved from the Internet: <www.Interviews.Fairness,com>, (2000), 5 pgs.

"P&G Technology Transfer", [online] [archived on Apr. 3, 2004], Retrieved from the Internet: <http://web.archive.org/web/20040403234657/http://pg.t2h.yet2.com/t2h/page/homepage>, (2004), 1 pg.

"P&G Technology Transfer FAQ", [online] [archived on Apr. 11, 2004], Retrieved from the Internet: http://web.archive.org/web/20040411130154/http://pg.t2h.yet2.com/t2h/page/faq, (2004), 2 pgs.

"Patent reform and third party submission of art: a proposed solution", [pnline] [archived May 7, 2005]. Retrieved From Internet: <http://web.archive.org/web/20050507031726/http://promotetheprogress.com/>, (Apr. 28, 2005), 11 pgs.

"RentACoder website", [online] [archived on Jan. 11, 2007]. Retrieved from the Internet: <http://web.archive.org/web/20070111121732/http://www.rentacodercom/RentACoder/default.asp>, (2007), 1 pg.

"RSA Factoring Challenge", Wikipedia. [online] Retrieved from the Internet: <'URL: http://en.wikipedia.org/wiki/RSA_Factoring_Challenge>, (Feb. 28, 2013), 8 pgs.

"Spreadshirt website", [online] [archived on Jan. 2, 2007]. Retrieved from the Internet: <URL: http://web.archive.org/web/20070102182609/www.spreadshirt.net/?lang=en&locale=GB>, (2007), 1 pg.

"Staples® Invention Quest", [Online] [archived Jan. 4, 2007]. Retrieved from the Internet: <URL: http://web.archive.org/web/20070104043104/http://inventionquest.dja.com/>, (2007), 1 pg.

"Threadless website", [online] [archived on Jan. 2, 2007]. Retrieved from the Internet: <URL: http://web.archive.org/web/20070102034935/www.threadless.com/help>, (/2007), 6 pgs.

"TopCoder website", [online] [archived on Jan. 2, 2006], Retrieved from the Internet: <URL: http://web.archive.org/web/20060101045331/http://wwvv.topcoder.com>, (2006), 1 pg.

"Venture2 website"[online] [archived on Feb. 14, 2007] Retrieved fom the Internet: <URL: http://web.archive.org/web/20070214074315/http://www.venture2.net/>, (2007), 1 pg.

"Verhaert website", [online] [archived on Dec. 31, 2006], Retrieved from the Internet: <URL: http://web.archive.org/web/20061231073917/http://www.verhaert.com/>, (2006), 1 pg.

"Wilogo website", [online] [archived Oct. 22, 2006], Retrieved from the Internet: <http://web.archive.org/web/20061022061807/http://en.wilogo.com/>, (2006), 2 pgs.

"www.bountyquest.com website", ©2001 BountyQuest Corp., [online]. [archived on Feb. 2, 2003]. Retrieved From the Internet: <URL: http://web.archive.org/web/20030202064932/http://bountyquest.com/>, (2001), 2 pgs.

"X Prize website", [online] [archived on Jan. 1, 2007]. Retrieved from the Internet: <URL:http://web.archive.org/web/20070101023418/http://www.xprize.org/>, (2007), 1 pg.

"yet2.com™website", ©1999-2001 yet2.com, [online] [archived on Apr. 5, 2001]. Retrieved From the Internet: <URL: http://web.archive.org/web/20010405070559/http://www.yet2.com/PSUser/y2_home.htm>, (Apr. 5, 2001), 1 pg.

"yet2.com to Establish Forum for the Exchange of Technology", [online] Retrieved from the Internet: <URL: http://marketplace.yet2,.com/app/abou/press?page=press1>, (Aug. 10, 1999). 2 pgs.

"YourEncore website", [online] [archived on Dec. 2, 2003]. Retrieved from the Internet: <URL: http://web.archive.org/web/20031202155620/http://www.yourencore.com/>, (2003), 1 pg.

Besaha, B., "Bounty Hunting in the Patent Base", *Communications of the ACM*, 46(3), (2003), 27-29.

Cave, D., "Who ya gonna call? Patent Busters!", [online] Retrieved from the Internet: <URL: http://www.salon.com/2000/10/23/cella/>, (Oct. 23, 2000), 7 pgs.

Diener. K., et al., "The Market for Open Innovation: Increasing the Efficiency and Effectiveness of the Innovation Process.", RWTH TIM Group, [online] Retrieved From Internet: <www.lulu.com>, (2010), 41 pgs.

Novecx, B. S., ""Peer to Patere": Collective Intelligence, Open Review, and Patent Reform", *Harvard Journal of Law & Technology* vol. 20, No. 1, (Fall 2006), 123-161.

Varchaver, N., "Patent review goes Wiki", *Fortune Magazine,* [online]. [retrieved on Mar. 5, 2013]. Retrieved from the Internet: http://money.cnn.com/magazines/fortune/fortune_archive/2006/08/21/8383639/Index.htm>, (Aug. 16, 2006), 2 pgs.

Walker, R., "Whose idea is it, anyway? 'Bounty hunters' track the validity of patents", *The Christian Science Monitor,* (Jan. 17, 2002), 2 pgs.

\* cited by examiner

Fig. 4

| PRIOR ART REQUEST | |
|---|---|
| IDENTIFICATION NUMBER | XX,XXX |
| SUBJECT PATENT(S) | European Patent Application Publication 0 955 071 A(2),based on European application number 99108984.4, to Richard A. Gamble, James William Moriaity, Jr, and Cheryl Malone Bab |
| CATEGOR(IES) | Mechanical |
| TECHNICAL DESCRIPTION | Claim 1:<br><br>BACKGROUND: An irradiation device for providing radiation treatment to lesion in an artery, comprising.<br><br>ELEMENT (a): a flexible elongated menber insertable into said artery:<br><br>ELEMENT (b): an expandable structure secured to said member and deliverable to said lesion by advancing said member in said artery: and<br><br>ELEMENT (c): a radiation source located within said expandable structure: said expandable structure being collapsed during delivery to said lesion, whereby said radiation source is shielded from said artery and being expanded near said lesion to expose said radiation source to said lesion.<br><br>Please respond with one or multiple prior art documents which describes each of the Elements (a) to (c) in the context of the background. |
| LATEST DATE FOR PRIOR ART | May 7, 1998 |
| POST DATE | January 1, 2000 |
| CLOSE DATE | Febuary 1, 2000 |
| REWARD AMOUNT AND DATE | $5,000 paid in March 1, 2000 for each of the 2 closest reponses with one or multiple prior art documents which describes each of Elements (a) to (c) in the context of the background with earliest submission dates. |
| SPONSOR | This web site |

Fig. 6A

| REGISTRATION | |
|---|---|
| GENERAL INFORMATION | FULL NAME (REQUIRED)_____<br><br>CONTACT INFORMATION-We only need one way to contact you but give us a fool-proof and fast one since it will be used to notify you about awards.<br>    E-MAIL _____<br>    ADDRESS<br>        STREET _____<br><br>        CITY,STATE,ZIP CODE _____<br><br>    PHONE [ ] DAY         [ ] EVENING<br><br>    FAX   [ ] DAY         [ ] EVENING<br><br>LOG IN NAME (REQUIRED)<br>PASSWORD (REQUIRED)<br>HINT FOR REFERSHING YOUR MEMORY ABOUT YOUR LOG IN AND/OR PASSWORD<br>(10 words or less) _____ |

Fig. 6B

| | REGISTRATION (CONT |
|---|---|
| WOULD YOU LIKE TO SELECT TECHNOLOGY CATEGORIES? Select one or more Technology Categories to display only prior art requests which match your interests. | Select as many categories as you want. The more categories you s number of prior art requests you'll receive. If you don't select any c "all technologies" category will be assigned to you for viewing all pri prior art request involves multiple technologies, for example, electrc biochemistry, it will be assigned to each relevant category, i.e., elec for electromechanical and biological and chemical for biochemistry.<br><br>[ ] ALL TECHNOLOGIES<br>[ ] BUSINESS METHODS<br>    [ ] ADVERTISING & MAF<br>    [ ] CONSUMER REWARI<br>    [ ] FINANCE<br>    [ ] INSURANCE<br>    [ ] ON-LINE AUCTIONS<br>    [ ] SELLING & PURCHAS<br>    [ ] SEARCH ENGINES<br>[ ] SOFTWARE<br>[ ] COMPUTER<br>[ ] ELECTRICAL<br>[ ] TELECOMMUNICATIONS<br>[ ] BIOLOGICAL<br>[ ] CHEMICAL<br>[ ] MECHANICAL<br>[ ] MEDICINE<br>[ ] DENTISTRY<br>[ ] AUTOMOTIVE TECHNOLOG<br>[ ] PLANTS PATENTS<br>[ ] DESIGN PATENTS |
| WOULD YOU LIKE TO SET-UP A CUSTOM SEARCH FOR RELEVANT PRIOR ART REQUESTS? This will identify prior art requests based on your customized search of a patent or other searchable documents on which the prior art requests are based. (Fees: assignee or inventor, $1000 per year; term search, $25 per month (the term search cannot include an assignee or inventor). | [ ] YES, I authorize the fee specified below to be paid to this web site based on the payment method entered in the financial information section of this registration. Monthly or yearly payments will continue until such time as you notify this web site that payments are to be stopped.<br>    [ ] Assignee (list the assignee(s))_____<br>    [ ] Inventor (list of inventor(s))_____<br>    [ ] Term Search (Use "AND" and "OR" between terms if relevant; see the help section of this web site for examples of searches. Searches are not case sensitive.)_____ |

Fig. 6C

REGISTRATION (CONTINUED)

WOULD YOU LIKE TO BE A SUBSCRIBER?

A subscription gives you the following benefits: you are notified by E-mail that a prior art request in your technical category or based on your custom search is available. Also, depending on the subscription level, the submission date of your responses are predated by up to four weeks.

This service takes effect one month after receipt of payment by this web site. Otherwise, if this service was applied immediately, a response could be predated at any time so that existing subscribers would be disadvantaged.

[ ] NO, you can access prior art requests for free at this web site.

[ ] YES, You authorize the payment specified below to be paid to this web site per year based on the method of payment entered in the financial information section of this registration. Yearly payments will continue until such time as you notify this web site that payments are to be stopped.

[ ] $25 PER YEAR, predate responses to prior art requests by one week and receive prior art requests by E-mail.
    [ ] $50 PER YEAR, predate responses to prior art requests by two weeks and receive prior art requests by E-mail.
    [ ] $75 PER YEAR, predate responses to prior art requests by three weeks and receive prior art requests by E-mail.
    [ ] $100 PER YEAR, predate responses to prior art request by four weeks and receive prior art requests by E-mail.

Fig. 6D

| | REGISTRATION (CONTINUED) |
|---|---|
| FINANCIAL INFO: PAYMENTS TO YOU | Your account contains monetary awards for winning responses to prior art requests as well as other financial information related to your use of this web site. Do you want a separate password for your account?<br><br>[ ] YES, ENTER PASSWORD _____<br><br>[ ] NO |
| | YOUR REWARDS: Payment of rewards to you. You can select an option for receiving your rewards now or when a reward is due to you.<br><br>[ ] CHECK MADE OUT TO<br><br>[ ] DIRECT DEPOSIT TO ACCOUNT<br>    BANK NAME _____<br>    ACCOUNT NO. _____<br>    ROUTING NO. _____<br><br>[ ] ACCOUNT NO. _____ |
| FINANCIAL INFO: PAYMENTS TO THIS WEB SITE | For payments from you to this web site, you can select a payment option now or when the payment is made.<br><br>[ ] CHECK MADE OUT TO THIS WEB SITE<br><br>[ ] CREDIT CARD<br>    NAME ON CARD _____<br>    ACCOUNT NO. _____<br>    TYPE OF CARD _____<br>    EXP. DATE _____<br><br>ADDRESS WHERE BILLS ARE SENT<br>    STREET ADDRESS _____<br>    CITY, STATE, ZIP CODE _____ |

Fig. 8A

| | | RESPONSE TO PRIOR ART REQUEST: GENERAL INFORMATION |
|---|---|---|
| 15 | USER | LOG IN NAME _____ |
| 61 | PRIOR ART REQUEST | IDENTIFICATION NUMBER _____ |
| 125 | TOTAL NUMBER OF PRIOR ART REFERENCES | THE TOTAL NUMBER OF PRIOR ART REFERENCES SUBMITTED _____ |
| 130 140 150 | INFORMATION SECTION FOR PRIOR ART REFERENCE NO. 1 A separate information section for each prior art reference must be included. PLEASE FILL-IN AS MUCH INFORMATION AS YOU CAN ABOUT THE REFERENCE. | IF THIS IS AN ARTICLE OR OTHER PUBLICATION<br>    TITLE _____<br>    AUTHOR OR COMPANY _____<br>    PUBLICATION DATE _____<br><br>IF THIS IS A PATENT OR PATENT APPLICATION<br>    PATENT NUMBER _____<br>    TITLE _____<br><br>    THE "ISSUE DATE," "PUBLICATION DATE" AND "FILING DATE"<br><br>WHAT THE PRIOR ART DESCRIBES (Please refer to the exact Element(s) of the Prior Art Request that this prior art reference describes and the exact text or figures of the prior art reference.)<br><br>_____<br>_____<br>_____ |

122 brackets 125, 130, 140, 150

| | |
|---|---|
| RESPONSE TO PRIOR ART REQUEST: GENERAL INFORMATION (CONTINUED) | |
| INFORMATION SECTION FOR PRIOR ART REFERENCE NO. 2. | IF THIS IS AN ARTICLE OR OTHER PUBLICATION<br>    NAME OR TITLE _____<br>    AUTHOR OR COMPANY _____<br>    PUBLICATION DATE _____<br><br>IF THIS IS A PATENT OR PATENT APPLICATION<br>    PATENT NUMBER _____<br>    DATE "ISSUE DATE" _____<br>    OR PUBLICATION DATE _____<br><br>WHAT THE PRIOR ART DESCRIBES (Please refer to the exact Element(s) of the Prior Art Request that this prior art reference describes and the exact text or figures of the prior art reference.)<br><br>_____<br>_____<br>_____ |

| RESPONSE TO PRIOR ART REQUEST: GENERAL INFORMA |  |
|---|---|
| INFORMATION SEC FOR PRIOR ART REFERENCE NO. 3 | IF THIS IS AN ARTICLE OR OTHER PUBLICATION<br>    NAME OR TITLE _____<br>    AUTHOR OR COMPANY _____<br><br>    PUBLICATION DATE _____<br><br>IF THIS IS A PATENT OR PATENT APPLICATION<br>    PATENT NUMBER _____<br>    DATE "ISSUE DATE" _____<br>    OR "PUBLICATION DATE" _____<br>    TITLE _____<br><br>WHAT THE PRIOR ART DESCRIBES (Please refer to the exa Prior Art Request that this prior art reference describes and th figures of the prior art reference.)<br><br>_____<br>_____<br>_____<br>(many blank lines) |
| ARE FULL TEXT AN FIGURE MARKED VERSIONS OF EACH PRIOR ART REFERE ATTACHED? | [ ] YES<br>[ ] NO. They must be received within 14 days of the actual date (not a pre-dated submission date based on a subscriptio no exclusions for weekends or holidays). |

124

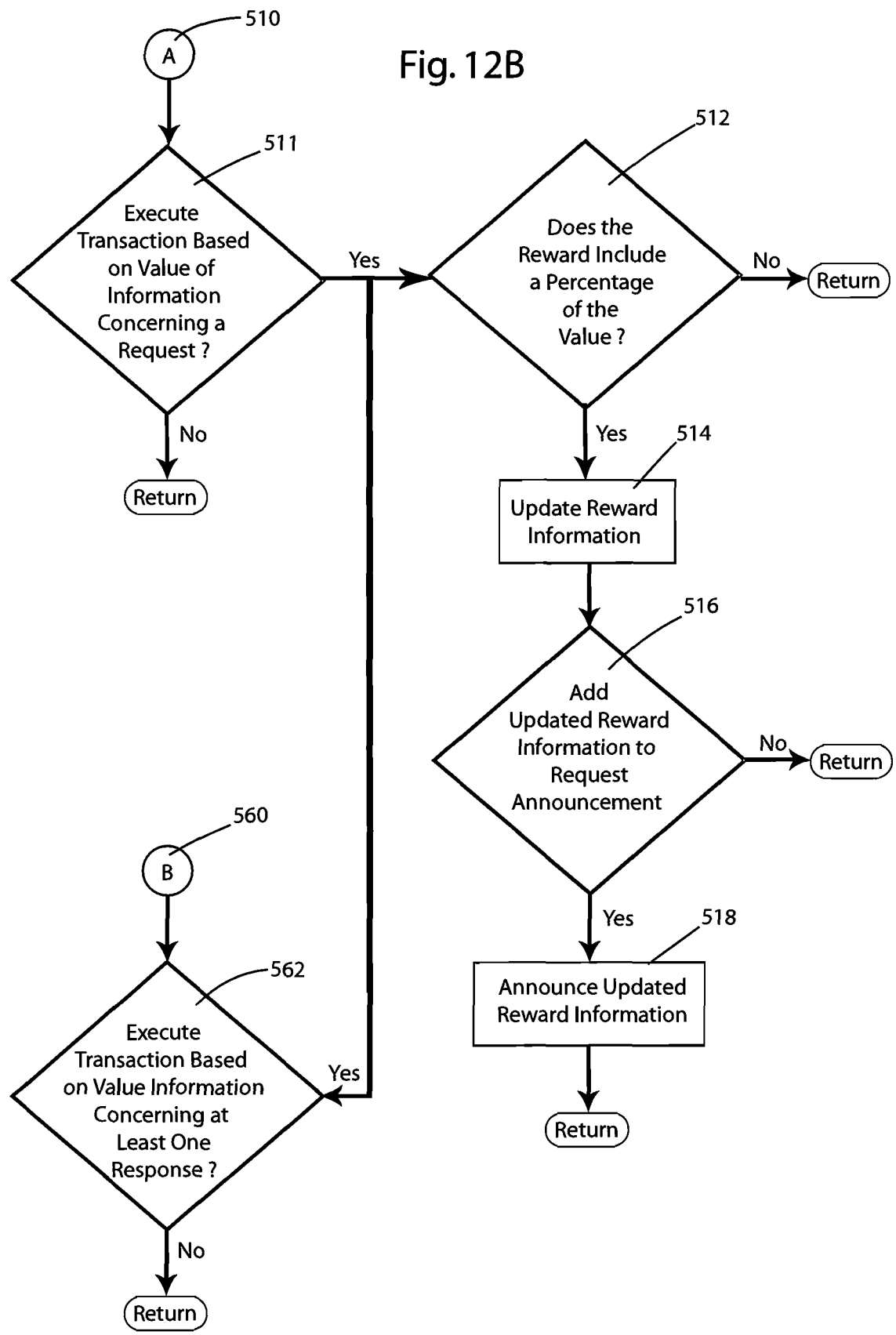

METHOD AND SYSTEM FOR REQUESTING PRIOR ART FROM THE PUBLIC IN EXCHANGE FOR A REWARD

This application is a continuation of U.S. patent application Ser. No. 11/933,343, filed Oct. 31, 2007 which claims the benefit of Provisional U.S. Application Ser. No. 60/920,395, filed Mar. 28, 2007 and this application also claims priority to U.S. patent application Ser. No. 11/933,362, filed Oct. 31, 2007, the contents of which are incorporated herein by reference in their entirety.

FIELD OF THE INVENTION

This invention relates to a computerized method and system for requesting prior art in exchange for compensation based on the value of information about at least one of the responses.

RELATED APPLICATIONS

This application is related to an application entitled "Method and System for the Requesting Receipt and Exchange of Information" 13/170,281 filed concurrently herewith, the contents of which are incorporated herein in their entirety.

BACKGROUND OF THE INVENTION

The technology explosion worldwide, particularly in e-commerce, and the value of patents in securing ownership of technology have caused the number of United States patents to grow dramatically.

An important public policy basis for the patent system is the advancement of technology by requiring inventors to enrich public knowledge through the publication of their inventions in a patent in exchange for a monopoly. The public thereby applies its increased knowledge to develop further inventions. A counterpart to this policy is that the Patent Office will not grant patents for inventions which are already publicly known. Evidence of public knowledge is found in "prior art," such as U.S. or foreign patents, published patent applications, published or unpublished but publicly available articles, textbooks, drawings, photographs, printed or handwritten documents or references, brochures, advertisements or other references, commercially available products or other evidence of publicly known technology or technology which has not been abandoned, suppressed or concealed, such as models, prototypes, commercial products or testimonial evidence of prior use, sale or knowledge, etc. (hereinafter called "prior art references"). Patentability involves analyzing prior art reference(s) in order to determine whether it explicitly or implicitly teaches an invention, for example, as described in a claim of a patent or patent application. If multiple prior art references contain relevant teachings, there is a further determination as to whether teachings from one or more documents can be combined to teach the claim.

The Patent Office's grant of a patent does not afford guaranteed patent protection. U.S. courts can further review a patent. This review involves the same analysis as the patentability determination performed by the Patent Office on a patent application. However, it is referred to as a validity analysis because it relates to an issued patent rather than a patent application. Courts review the patent when its validity arises during patent infringement litigation, i.e., when a patent owner charges a party with infringement, or during a declaratory judgment action, i.e., when a party threatened with infringement asks a court to declare a patent invalid. Therefore, even if the Patent Office has determined that the claims of an application are patentable so that a patent issues, a court may later determine that one or more of the patent claims are invalid.

When a court reviews a patent during litigation, it analyzes the prior art that was considered by the Patent Office and may also review additional evidence of prior art presented by the parties to the litigation. Parties gather evidence in the fact-finding stage of litigation, called discovery, during which they generally do extensive searches for prior art. The search for such evidence by litigants is normally very expensive. As a result, they generally find prior art that the patent Examiner did not have at his disposal during the Patent Office examination. New prior art at the litigation stage is less desirable for the patent owner than during Patent Office examination because the patent owner cannot tailor the claims to avoid the prior art. Rather, the claims stand or fall as presented in the patent. On the other hand, this stage is helpful for a potential infringer because new prior art in litigation gives the court additional bases to find the patent invalid. Also, it is easier to invalidate a patent in litigation based on new prior art than on prior art that was considered by the Patent Office.

The courts are the final arbiters of patents. As a result, when the courts ultimately determine that a patent is invalid, the patent owner loses his legal rights to the protections of the patent. In addition, when a patent is invalid, it cannot be used as a basis for a patent infringement complaint. Therefore, with rare exceptions, patent validity is a key issue in litigation because a finding of invalidity requires a dismissal of an infringement complaint for a product or process that could otherwise be found to infringe the patent.

Patent applicants, patent owners and alleged infringers are not the only parties interested in the validity of patents. Most importantly, members of the public benefit from patents having strong bases for validity. This is because patent owners can charge a premium for products or processes covered by patents. This premium is based on the patent right of excluding others from commercializing (among other things) technology covered by the patent claims. The public cannot recover premiums paid based on a patent which a court later finds to be invalid.

Also, the financial community is interested in the validity of patents in making investment decisions. Companies can also benefit from greater knowledge about the validity of third party patents in determining whether they must design around a competitor's patent or commercialize a potentially infringing product based on one or more competent opinions from individual attorneys that the patent is invalid. In addition, patent owners who consider commercializing a product covered by their patent benefit from greater information about whether competitors can be excluded from their market based on strong patent protection. Similarly, the validity of patent portfolios for public companies can affect stock prices, and knowledge about the validity of patents is applicable to valuing the company that owns the patents.

Therefore, there are myriad scenarios in which the validity of patents is important to the general public, patent applicants, owners, competitors and the financial community. Consequently, comprehensive prior art with which to evaluate patentability and validity increases the strength of the patent system by decreasing the number of invalid patents, narrowing the claims during Patent Office examinations to define valid inventions in view of more comprehensive prior art and, for applications which issue as patents, increasing the number of meritorious patents such that the cost to the public of monopoly pricing is better justified.

In addition, since Examiners' resources for identifying prior art during examination can be limited, additional or more relevant prior art is generally presented during litigation. As a result, a large percentage of patents litigated are found to be invalid. This means that during the period between patent issuance and the outcome of litigation, patent owners have legal rights to the patented technology, including the potential for monopoly pricing. Moreover, only a very small percentage, determined historically to be about 1.5% of issued patents are actually litigated. As a result, for the remaining about 98.5% of patents, validity is never analyzed by a court.

As a result, there is a need for increasing the amount and quality of prior art that is found. Common methods of finding prior art are computer searches of patent or technical databases and hand searches of paper copies of prior patents, publications and foreign patents at the Patent Office. Members of the public also hire third party researchers, for example, technical experts or consultants, patent researchers or general researchers to conduct searches for them; Examiners perform their own searches. Third party researchers are paid a fee for providing search results, whether the results are relevant or not. Other common methods of finding prior art for members of the public are to subpoena companies or individuals for such prior art. These approaches are general research techniques well known to those of ordinary skill in the art and will not be described further herein.

There was an instance in which members of the public were requested to send relevant prior art to a central source, in this case, a company, which was sued for patent infringement. More particularly, Netscape presented a request on a web site which it hosts called mozilla.org (the text is available as of Feb. 10, 2000 at http://www.mozilla.org/legal/wangsuit.html) for prior art to defend against a patent infringement action by Wang (based on U.S. Pat. No. 4,751,669). The request was therefore made available to visitors of Netscape's mozilla.org web site. Visitors were asked to respond by providing prior art to invalidate the patent claims on a gratuitous basis. As of Feb. 10, 2000, Netscape reported that the case settled.

Another company, BountyQuest, had a web site offering payments to those who can prove or disprove patent claims and providing a means to settling patent disputes between companies. The company hoped to exploit the concerns of those who felt that the US Patent Office was failing to serve the new economy. BountyQuest encouraged scientists, engineers, professional researchers or any people with specialised knowledge to find evidence critical to issues of patent validity. BountyQuest essentially created a human search engine of knowledgeable "Bounty Hunters" who track down this type of fugitive information for cash rewards. BountyQuest rewards started at $10,000 and were a fixed monetary amount included in the announcement of the bounty.

The understanding on Wall Street is that there are two ways to acquire patent information to accurately value stocks, acquisition or litigation, both of which are unpredictable as to timing (these activities take years) and the result. For example, Local.com announced patents covering the "industry standard for local search" in June/July 2007. On June 29, a Yahoo Finance analyst picked up a posting from a financial blog about the patent announcement. Local.com went from a sleeper to being ranked among the 20 most active U.S. stocks on July $2^{nd}$ with an increase of 70% to $8.96. The stock price as of July 17 was maintained at $8.85. Wall Street clearly identified it as an event with extraordinary impact on the stock. It was reported in a Barron's article entitled "Local.com Shares In A Patent-Driven Frenzy." Commentators went further, offering that further stock valuation/correction is based on a wait and see approach. "[H]ow these new patents will affect the stock is hard to determine. 'The patents make it more attractive but how much is anybody's guess . . . "You don't know if other people are infringing on the patent. You don't know how broad the patent is. You don't know if they're going to fight it and demand money from company's [for patent infringement], and you don't even know if the patent is valid until it gets tried in court . . . '" said Jon R. Hickman, an analyst at MDB Capital Group.

There is a need to improve the comprehensiveness of prior art for patent applications and issued patents generally. There also is a need to enable the public to recover some of the premiums paid for patents later found to be invalid. Further, there is a need for a forum in which prior art can be requested for a broad variety of patents or other technical or non-technical subject matter and the public can view the multiple and varied requests and submit responses. With a broad range of prior art requests, such a forum can attracts a large audience, which increases the chance of receiving relevant prior art in response.

SUMMARY OF THE INVENTION

There is disclosed a system and method for patent owners and interested members of the public to post prior art requests (also hereinafter sometimes referred to as finder's fee searches and the individuals who respond to them are referred to as searchers) for a variety of inventions for access by at least one member of the public in exchange for a reward for at least one closest response. For example, in one embodiment of this invention, patent applicants, their competitors or other interested public members can prepare prior art requests, have them posted on a web site and submit the closest responses to the Patent Office or courts. Requests also can be generated without third party initiation but rather by the hosting web site or organization. Such requests can also be made anonymously on the web site. In addition, such requests can be made without an offer of a reward. In another embodiment, the reward can be any one or a combination of a fixed monetary amount, a variable amount based on the value of information concerning the responses and/or transactions, such as for example, investments and/or auctions, involving the response(s), including the response(s) which invalidate a patent or request subject matter and/or the response(s) which do not invalidate a patent or request subject matter.

There is also disclosed a systematic method of informing members of the public about requests for prior art regarding pre-selected inventions. In an embodiment of this invention, the prior art requests can be organized for display according to predetermined technology categories to which the requests are assigned. As a result, users can have the option of viewing only those prior art requests that match their technical interests.

In another embodiment of this invention, a request can be combined with one or both of an investment strategy and/or an auction process. With the present invention, requests and related investment strateg(ies) can be controlled in a finite time period for a specific outcome. The identification of invalidating prior art or the absence of it, provides concrete information about patent valuation. Rather than a company press release starting a patent frenzy, the system operator can provide a controlled and authoritative result for informing Wall Street of more predictable valuations. In addition, the reward can include a variable component equal to a percentage of profits from a specific investment based on the request, the profits of the host of the request or more generally the organization which supports the request forum, the profits from any auction proceedings etc. For example, the system of the present invention can include combining the request(s) with transactions to gain value from the result. For example, the entity which hosts the requests can sell the result prior to or after the announcement of the outcome of the request to Wall Street investors. The hosting entity also can execute its own investments, for example, by a hedge fund operating component of the host. In effect, the operators of a system according to the present invention can sell subscriptions to provide the information to hedge fund/investors and the hedge fund can offer investment opportunities. Further, if the winning response is publicly disclosed, the non-winning responses also can be valuable for auction or investment transactions.

The auction process can be either a single auction or a multi-tiered process timed to correspond to stages in the request process. The request submissions and/or results can be auctioned as a separate process from the request by implementing a request and then auctioning the results. This can be done on an individual basis or a group can be formed of one or more requests for which an auction process is implemented, whether or not there is an announcement regarding an individual or a group request implementation of an auction.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conceptions and specific embodiments as a basis for designing or modifying other features for carrying out the same purposes of the present invention. Further elements of one embodiment may be combined with elements of other embodiments. Those skilled in the art should also realize that equivalent features do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which:

FIG. 4 shows a web page for a prior art request;

FIGS. 6A to 6D illustrate web pages for the registration of a user of the web site;

FIGS. 8A to 8C illustrate web pages for a form for responding to a prior art request;

FIGS. 12A, 12B and 13 show flow charts of detailed processing flows at the web site for offering requests and executing transactions with various timing related to the processing steps of the request, sequences and combinations based on the value of information concerning the requests and/or response (s) to the request;

DETAILED DESCRIPTION OF THE INVENTION

Overview of System

Figure 1:
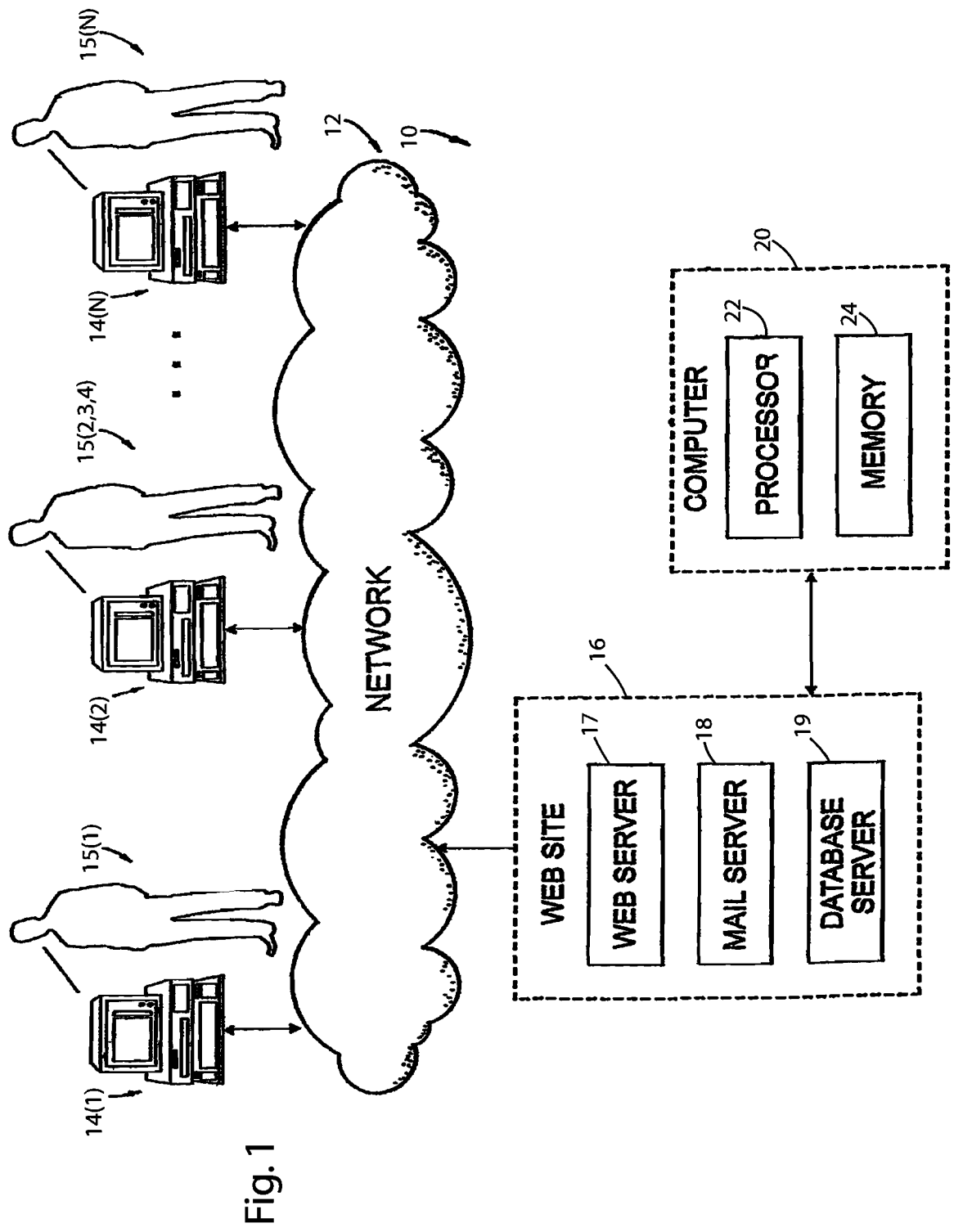
FIG. 1 shows an overall environment in which the present invention can be used.

FIG. 1 shows an example of an overall environment 10 in which this invention can be used. Environment 10 includes a network 12, such as the Internet, Intranet, "Future Net" or any other network known or later developed which connects computers. Consumer computers 14 are connected to the network 12. Computers 14 are shown as 14(1), 14(2) to 14(N) and they can be operated by users 15(1), 15(2), 15(3), 15(4) to 15(N). N as used herein denotes an unlimited quantity of the object to which it relates and the value of N can change for each object. Therefore, any number of computers 14 can be connected to network 12 and each computer 14 can be operated by any number of users 15.

Also connected to network 12 is web site 16, in which an embodiment of this invention is implemented. Web site 16 posts one or multiple prior art requests 60 such as that shown in FIG. 4. Each request 60 is for one or more prior art references that describe a technology in exchange for at least one closest response 120. An exemplary request 60 is shown in FIG. 4 and a form for response 120 is shown in FIGS. 8A to 8C.

Since web site 16 is also connected to network 12, users 15 can access web site 16 from any computer 14 throughout the world having appropriate network access and software, such as a web browser. In alternative embodiments, users 15 can gain access to web site 16 or the business supporting it, including web site 16 employees, from other mechanisms, such as E-mail outside web site 16, facsimile or telephone.

Various hardware devices can operate web site 16. Such devices are a design choice which are well known to those of ordinary skill in the art and do not limit this invention. For example, a web server 17 can service users 15 of web site 16, including storing and operating the applications, screen displays and images for web site 16 as well as the sub-systems for operating web site 16, etc. Also, a database server 19 can store databases for prior art requests 60, users 15, responses 120, rewards and all other programs and data to support web site 16, etc. A mail server 18 also can be included in order to communicate E-mail between users 15 and web site 16. Additional web servers, database servers and mail servers can be added to support an increased load on web site 16.

Also, web site 16 can be generated, operated, updated and administered by a computer 20 that connects to servers 17, 18 and 19 supporting web site 16. Computer 20 operates based on a processor 22 under the control of a program. For ease of reference, such processing will hereinafter be indicated by the use of the term "Computer 20." Computer 20 also includes memory 24 (including one or more storage elements, such as a hard disk or RAM; additional memory can be added). Computer 20, processor 22 and memory 24 are used to access servers 17, 18 and 19 and run the software necessary for generating and maintaining web site 16. Computer 20 can also process communications between user 15 and employees of web site 16, such as, for example, E-mail using mail server 18, facsimile or telephone, etc. In addition, computer 20 can be implemented in one or more computers such as, for example, computers 14. Other alternative communications between users 15 and the employees of web site 16 such as, for example, postal mail, facsimile, outside computer 20, etc. are also contemplated as within this invention. In addition, many other hardware configurations known in the art can be used to implement this invention.

Overview of Web Site 16

Figure 2:
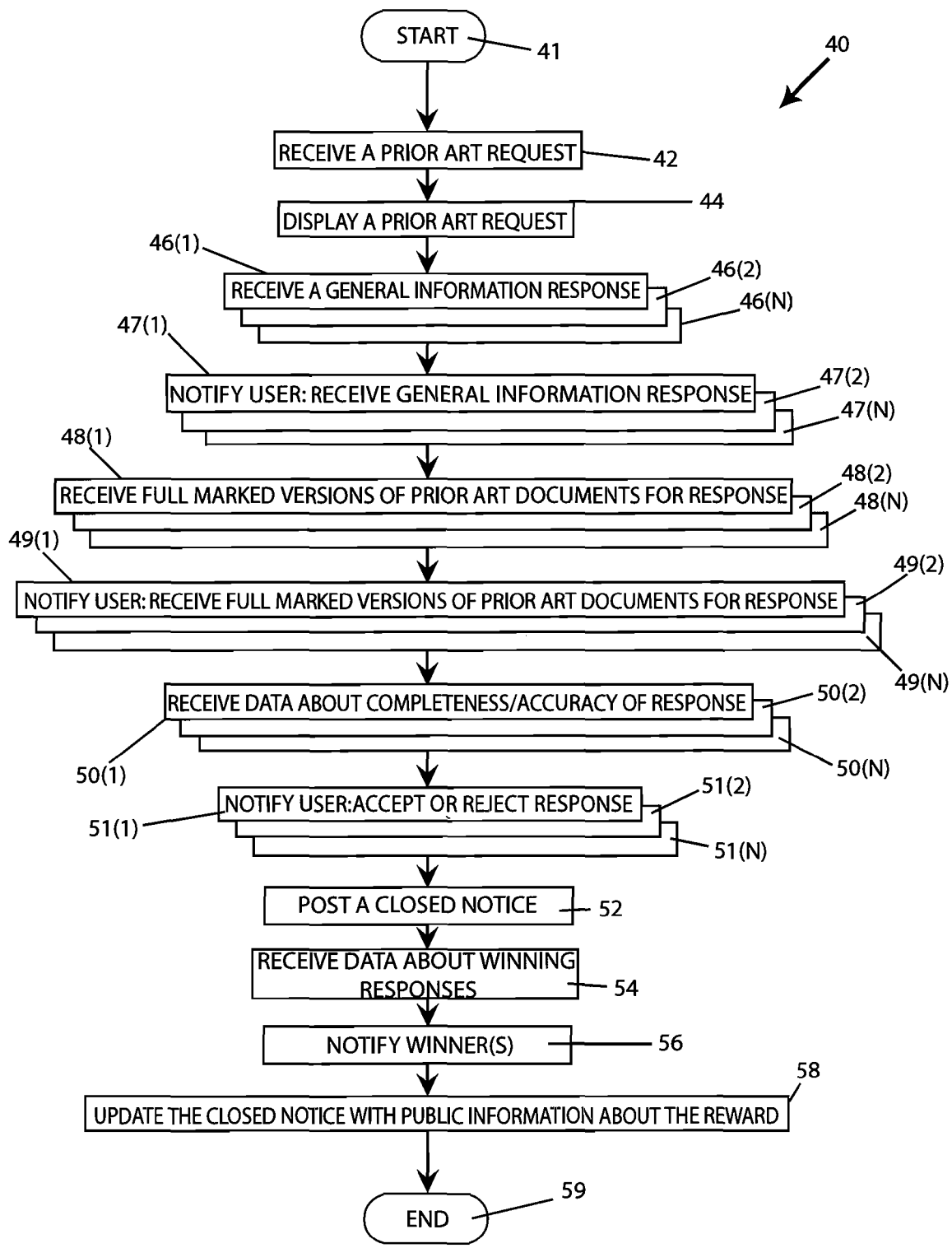
FIG. 2 shows a flow chart of high level operation of a web site for carrying out a single prior art request.
Figure 3:
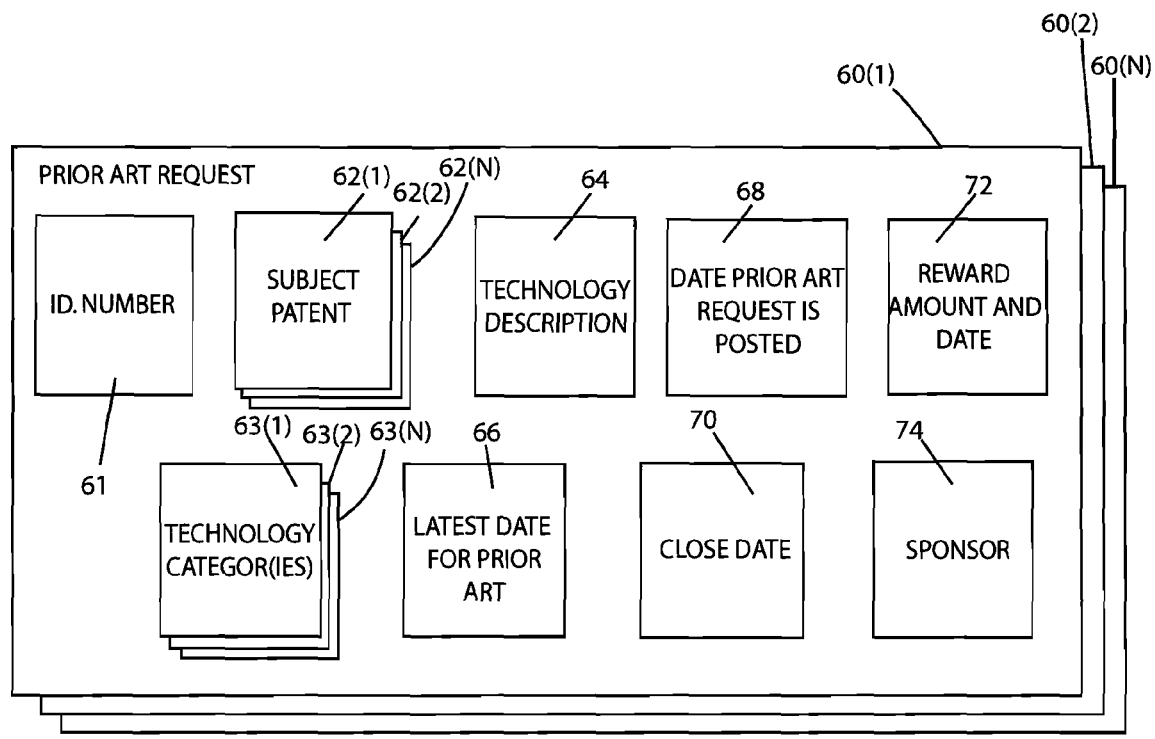
FIG. 3 shows a database which contains data for prior art requests.

FIG. 2 shows a flow chart of a high level operation 40 of web site 16 according to an embodiment of this invention. This flow chart shows the processing for a single prior art request 60 (also referred to as a finder's fee search). Initially, web site 16 receives and posts prior art request 60 (as shown in FIG. 3) (steps 41, 42 and 44). Prior art request 60 can be a description of technology for which prior art is sought from members of the public. Technology descriptions can derive from, for example, issued U.S. patents, foreign patents, U.S. or foreign patent applications, publications, trade secret or non-public products or processes, commercialized products or processes, business models or a portion or combination of any of these, etc. Where request 60 relates to the claims of a patent or patent application, the technology description can be derived specifically or generally from all or a portion of one or more claims, an edited version understandable to those outside the patent law field of one or more claims, the exact text of one or more claims or a portion or combination of any of these. For example, where a part of the invention described in a claim is already known, the known part can be excluded from request 60 so that only a portion of the claim is the subject of request 60. The breadth and abstraction level of the technology description do not limit this invention.

Prior art request 60 can also include a date by which any prior art references must be dated (called "the latest date for prior art"), a date when request 60 is posted, a date when request 60 expires (or is closed so that no further responses 120 will be accepted) and a date by which a reward will be paid. Further, the type of reward, for example, a monetary amount, can be provided in request 60. This information is shown in FIG. 3. The latest date for prior art can be the latest date that documents qualify as prior art under 35 U.S.C. 102 and the case law which interprets it or another arbitrary date set forth in request 60. Also, requests 60 can originate from web site 16 or from third party sponsors, such as parties to a litigation or patent owners. More particularly, a third party can prepare a prior art request 60 and hire web site 16 to post it and process responses 120. Also, in alternative embodiments, requests 60 can be streamlined or customized by the third party or web site 16 so that less or different information is provided depending on the objectives of the sponsor. For example, a latest date for prior art can be omitted or can be an arbitrary date based on knowledge of the sponsor that a particular date is necessary. In another embodiment, web site 16 can post requests 60 which do not include an offer of a reward for the closest response(s). In this case, responses 120 (FIGS. 8A-8C) to requests 60 are gratuitous.

Once prior art request 60 is posted on web site 16, it is available for display to multiple users 15 who access web site 16 (step 44). In one embodiment, web site 16 can provide a forum for posting prior art requests 60 organized by the subject matter of the technology (called technology categories), terms pre-selected by user 15, inventors, assignees or other customized searches as specified by user 15. User 15 can select technology categories and have the option of setting-up such customized searches in a registration form on web site 16 (as shown in FIG. 6B). Technology categories are also assigned to each request 60. In this way, user 15 can view only those requests 60 which relate to technology categories that he has selected. In addition, where requests 60 are based on patents or other searchable documents, web site 16 can apply a customized search to display only those requests 60 based on patents or other documents which are identified by the search.

The next event that triggers processing by web site 16 is submission by a user 15 of a response 120. For ease of discussion, a single response 120 submitted in step 46(1) is used as an example for the description of steps 46(1) to 51(1). Multiple steps (1) to (N) for steps 46 to 51 are shown because multiple responses are expected for each request 60 and steps 46 to 51 are performed for each such response 120.

The response 120 can take any form or content which provides information related to the request 60. For illustration purposes and without any limitation on the scope of the claims, in one embodiment, response 120 can include two parts: First, response 120 can be an electronic form in which user 15 provides general information about the response (as shown in FIGS. 8A to 8C; step 46). This form includes the following information: the identification of user 15 (for example, user's 15 log in); an identification number for prior art request 60 to which response 120 is directed; the total number of prior art references submitted for response 120; and, for each prior art reference, citation information (including the publication or effective date) as well as a description of the relevant teaching of the document. This can be treated as a first phase 122 of response 120.

The second part of response 120 can be a full copy of each prior art reference identified in first phase 122 with the text and/or figures of each document marked to indicate the portions which are relevant to response 120 (step 48; this is hereinafter referred to as "second phase 124" and it includes a full version of marked prior art references). A document can be marked in various ways to focus attention on selected text and/or figures, such as by electronic word processing edits or manual markings with, for example, a pen or highlighter, etc. The marking approach does not limit this invention. Second phase 124, in this embodiment, can be transmitted electronically as an attachment to first phase 122 (as referenced in FIG. 8C) or by any other transmission method, such as facsimile, E-mail, postal mail, etc. In addition, in order for response 120 to be eligible for a reward or to be considered complete, second phase 124 must be received within a predetermined period of time from the actual date of submission of first phase 122 (step 48). The predetermined period of time can be provided in request 60 or standardized and provided in a general instruction section of web site 16 for responding to requests 60. The particular time frame does not limit this invention. For example, the time frame could be 5 days, 14 days, 3 or 4 weeks or any other time frame. Further, to facilitate processing the timely receipt of second phase 124, a period of time without any exclusion for holidays or weekends can be applied. In addition, the first phase 122 actual submission date can be the date of transmission of first phase 122 through web site 16 or the date of receipt of such first phase 122 of response 120 if it is transmitted outside web site 16. As set forth in request 60, an example of a time period is 14 days from the actual submission date of response 120 with no exclusions for weekends or holidays. Therefore, in this embodiment, if the full version marked documents are sent by postal mail and the fourteenth day is a Sunday, they must be received by the Friday prior to the Sunday to be timely. In this embodiment, if is the document or documents are not received within the time period, response 120 is rejected and is ineligible for a reward.

In alternative embodiments, the time requirement for receipt of documents can be excluded so that the first phase 122 is a complete response 120. In further alternative embodiments, the documents in second phase 124 of response 120 can include non-marked and/or portions of documents rather than full versions. In addition, in further alternative embodiments, the form for the first phase 122 of response 120 can be streamlined so that users 15 are not required to provide as much information. For example, the first phase of response 120 can omit an explanation of the relevance of the prior art references and the citation information can be kept to the minimum necessary for web site 16 employees to obtain the prior art reference(s). In another embodiment, the response simply can be one or more prior art references or identification of such reference(s) with minimal identifying information about the user 15. In one embodiment, multi-phase responses 120 are not implemented.

The transmission method of the phases 122, 124 of the responses 120 can vary in alternative embodiments of this invention. For example, they can be electronically transmitted or E-mailed through web site 16 or outside of web site 16, or sent by postal mail or a combination of any of these or any hereinafter discovered transmission method. Where document 124 is sent outside web site 16, web site 16 can merely display information about how to send such response. Also, methods of transmission can be different for each phase of the general information response. The methods of transmission do not limit this invention.

Web site 16 can send notifications to user 15 to confirm the receipt (steps 46 and 48) of the phases of responses 120, i.e., phases 122 and 124, respectively. Web site 16 then receives data about the completeness and accuracy of the phases 122 and 124 (step 50). The analysis to determine whether response 120 is complete and accurate can be conducted by, for example, an employee or affiliate of web site 16. Employees or affiliates of web site 16 include employees or consultants of web site 16 and any third parties affiliated with web site 16 on a permanent or temporary basis, such as a third party sponsor of request 60 or a law firm or other attorneys or professionals. In alternative embodiments, computer 20 can include software applications to perform part of this analysis or the complete analysis. However, in this embodiment, since the document 124 data can arrive by postal mail or otherwise outside web site 16, data about the document 124 may have to be separately entered into computer 20. In addition, the analysis can include a subjective evaluation of publication dates, etc., which may not be suitable for a software application. More particularly, the analysis of documents 124 can include verifying the identification number of request 60 and ensuring the receipt of the prior art references cited in the first phase 122 of response 120. Also, the publication dates of the prior art references can be compared to the latest date for prior art set forth in request 60 to ensure that the documents predate the latest date specified. Response 120 may not be complete, for example, where the citations in the first phase 122 do not match the full version marked prior art references sent in the second phase 124 or one or more of such prior art references postdates the latest date for prior art. As another example, if document 124 is not received within the predetermined period of time from the actual submission date of the first phase 122 of the response, it can be deemed to be too late. In both examples, response 120 can be rejected and ineligible for a reward. In further embodiments, the first phase 122 can also be analyzed for dates and the completeness and accuracy of citations before receipt of the second phase 124. Web site 16 can then notify user 15 of either the acceptance or rejection of response 120 (step 51).

The process in steps 46 to 51 of reviewing and confirming responses 120 continues for the duration that each request 60 of step 44 is open. In addition, the same process applies to each request 60. When the close date for request 60 arrives, closed prior art request notice 160 can be posted on web site 16 (shown in FIG. 9). Notice 160 can include prior art request 60, a notice that request 60 is closed so that no further responses will be accepted (step 52) and the status of processing responses 120 for one or more winners.

During the time frame from the date that request 60 is closed to the date on which any rewards are paid out, the processing in steps 47 to 51 can be completed for each response 120. After each response 120 is analyzed to determine its completeness and accuracy, the accepted responses 120 can then be further analyzed to select one or more winners (depending on the reward specified in request 60).

In an embodiment, one or more winning responses 120 can be determined based on the completeness and accurate of responses 120 and prior art references which come closest to explicitly or implicitly teaching the technology described in request 60 based on application of 35 U.S.C. 102 and 103 and the case law which interprets them. Although selecting a winning response 120 can include analysis under 35 U.S.C. 103, the form for first phase 122 can include only a request for a description of the teachings of each prior art reference, rather than a request for an argument for combining multiple prior art references. Such further argument can be too burdensome for user 15 and, rather, can be best made by an attorney or other person who analyzes responses 120 in order to select the winning response 120. In alternative embodiments, user 15 can be required to present a complete analysis under 35 U.S.C. 102 and 103. In addition, in an embodiment of this invention that includes a subscription option 94 (as shown and described regarding FIG. 6C), user 15 who is a subscriber can have a submission date which is predated from his actual submission date for the purposes of determining winners(s). This predated submission date is called a reward submission date. Therefore, for determining winners, actual submission dates can be used for non-subscribing users 15 and reward submission dates can be used for subscribing users 15. The completeness of the first phase 122, including the description of the prior art references and their teachings, can also be taken into account.

The determination of winning responses 120 is preferably conducted by attorneys because they satisfy one of the standards of competency required under U.S. Patent Law for validity opinions. However, for preliminary analyses for validity opinions or where there are other bases for requesting prior art, attorneys need not determine the winners. Web site 16 can employ attorneys on its staff or outsource the analysis to law firms or other sources, including non-attorneys. For example, where a request 60 is sponsored by a third party, such as a party to a litigation, responses 120 can be given to the third party for selection of the winning responses 120 based on their own criteria. The identity or profession of individuals who perform the analysis to select winners does not limit this invention. In addition, in order for users 15 to register so that they are able to submit entries, they can be required to agree to contractual provisions, including an acceptance of the method of analyzing and determining winning responses 120 as preferably based on 35 U.S.C. 102 and 103 and an acknowledgment that the method has a subjective component such that two persons applying the same analysis can produce different results. However, the contractual provisions can also include a guarantee that the reward listed in request 60 will be paid to the closest responses 120, regardless of whether or not the winning responses 120 invalidate the subject matter of requests 60.

Once the winning responses 120 have been selected, data about the winning users 15 can be entered for receipt by web site 16 (step 54). Web site 16 can then notify the winning users 15 (step 56). Monetary rewards can be paid from web site 16 to users 15 or, in alternative embodiments, payment can be made to users 15 from a third party, such as, for example, a third party sponsor of request 60.

The processing for a given prior art request 60 can be completed when web site 16 posts a closed prior art request notice (step 58), including public information about the winning entries and the winners. In additional embodiments, including the processing steps and systems described in FIGS. 12A, 12B, 13, 14A, 14B, 15A and 15B, additional information about transactions executed based on the request 60 and/or response(s) 120, can be announced, including information about financial transactions, disclosures and statements to satisfy any relevant U.S. or International laws concerning such transactions, legal standards and compliance therewith, compliance statements, auctions and where such exemplary transaction impact the reward amount (e.g., a variable portion of the reward is based on a percentage of value gained in a transaction), information about the reward etc. Where the web site 16 or organization hosts at least one of the requests 60, the host can determine the information to disclose about request 60 on an individual basis or generally (subject to individual transactions with third party hosts where the third party hosts enter into a contract accepted by the host to control a portion or the entirety of the request 60), including identifying winners, making available winning response(s) 120 in whole or in part, combining portions of response(s) to provide an analysis of invalidity regardless of whether the response(s) are from one or more multiple sources, other non-winning responses or the identity of any of the response(s) 120.

Public availability of information about winning responses 120 can depend on the source of request 60. For example, where request 60 is based on a litigation, specific information about winning responses 120 can be precluded from being published based on the terms of the litigation or the interest of the sponsor. In addition, the winner may not wish to have his identity made public. Therefore, permission from each of the winners and sponsors can be required before any information is posted about the reward and the identities of the winners. Where none of the information can be made public, the closed notice can include a date that the reward was paid out and the fact that the information is otherwise private or confidential. Preferably, the contractual provisions which users 15 can be required to sign before submitting responses 120 can include an acknowledgment and acceptance of the fact that information about winning responses 120 and winning users 15 can be confidential and, therefore, inaccessible on web site 16. And disclosure of request 60 and/or response(s) 120 or the absence of a disclosure, even that a request 60 is closed, is within the scope of this invention.

One model for profitability of site 16 or the sponsoring organization is to use the information from the response(s) 120 in transactions such as financial or auctions to produce revenue streams for the site 16, which can be shared with the searchers who provide response(s) 120. Other models for profitability for web site 16 are based on fees from users 15 and from sponsors. Regarding users 15, access to web site 16 and prior art requests 60 can be free pursuant to the culture of the Internet. However, there can be a nominal fee, such as $5 for each prior art reference up to 5 documents and $25 for each additional document submitted in response 120. The purpose of this nominal fee would be to subsidize costs for processing responses 120 and, more importantly, to discourage responses 120 which include a "dump" of any prior art reference that may be relevant or that user 15 may be aware of, regardless of its relevance. This shifts the responsibility for initially reviewing the relevance of prior art references to users 15 instead of to web site 16 or to sponsors of requests 60. This profitability model is enhanced by web site 16 supporting a large audience with diverse technical interests based on providing a broad variety of technologies upon which requests 60 are based. With a large audience, the chances of receiving responses 120 with relevant prior art are increased.

In addition, optional features can be included in web site 16 for users 15 in order to build a fee base. For example, users 15 can be given the option of subscribing to web site 16. A subscription can provide several benefits: First, prior art requests 60 can be sent directly to users 15 by E-mail (in addition to their availability on the web site 16) in order to provide immediate notification of requests 60. Second, a subscribing user 15 can have a submission date for purposes of determining winner(s), i.e., a reward submission date, which is predated from his actual submission date. The amount of predating can be based on a schedule of subscription fees. For example, in order to have a reward submission date that is predated from the actual submission date by one week, user 15 can pay $25 per year. Similarly, user 15 can pay $50, $75 or $100 (or any other amounts) for a reward submission date that is predated from the actual submission date by two weeks, three weeks and four weeks, respectively. The time frames and amounts shown are merely examples and do not limit this invention. Other time frames and amounts can be used. As described below regarding FIG. 6C, the subscription request should be implemented after a time delay in order to reduce the incentive for user 15 to become a subscriber only when he has a valuable response 120 to a request 60.

In one embodiment in which third parties sponsor requests 60, all or portions of rewards can be funded by sponsors in exchange for copies of the responses 120 to prior art requests 60. An exemplary reward can be $10,000, including $5,000 for each of the two closest responses 120. In addition, web site 16 can contract that the sponsor selects the winning responses 120 before the reward date. In this way, the processing cost by web site 16 can be reduced to the administrative cost of processing the accuracy and timeliness of responses 120, rather than the analysis of responses 120 to select the winners. Also, web site 16 can charge a transaction fee for each prior art request 60 posting from a sponsor. An example of a transaction fee can be $5,000. The amounts of fees and rewards shown are examples for an embodiment of this invention and do not limit this invention.

Detailed Description of Web Site 16

FIGS. 3 to 11B provide embodiments of this invention which include alternatives to the embodiments described in the overview of web site 16 or shown in FIG. 1 or 2. FIG. 3 shows a database which contains data for prior art requests 60(1), 60(2) to 60(N) according to an embodiment of this invention. Prior art request 60 can include information to give user 15 guidelines for identifying prior art. The information can be as follows: an identification number 61 for prior art request 60; the "subject patent" 62; technology subject matter category(ies) 63; a technology description 64; a date by which responsive prior art must be dated 66 (called the "latest date for prior art"); a post date 68 or a date that request 60 is posted; a close date 70; a reward date (i.e., a date by which a reward will be paid) and a reward amount 72; and, a sponsor 74 if applicable, for example, a third party sponsor. The information shown in FIG. 3 for request 60 is exemplary. In alternative embodiments, additional data can be included in request 60 or one or more of the information 61, 62, 63, 66, 68, 70, 72 or 74 can be excluded so that only a technology description 64 is included. Therefore, the particular information presented in prior art request 60 does not limit this invention.

Where an identification number 61 is used, it can be any reference numeric or alphanumeric characters which designate request 60. In alternative embodiments, there need not be any identification number or the identification number can be the patent number, or there can be a variety of identification approaches for requests 60. Number 61 can be used, for example, to organize requests 60 on web site 16. The subject patent 62 can be an issued U.S. patent. Moreover, it can also include a U.S. published patent application (after Nov. 29, 2000), a foreign or international patent or published application, a non-published patent application (based on authorization by the owner) or any other technical or non-technical subject matter, such as a description of a commercial product or a business model, etc. Once the Patent Office publishes an application, it is made public so that posting a related prior art request 60 on web site 16 does not lose secrecy. Then, prior art submitted in response to requests 60 can be provided to the Patent Office under 37 C.F.R. 1.99. Third parties can also post requests 60 and submit the results to the Patent Office for competitors' patent applications. However, submission by third parties to the Patent Office will likely be limited because by statute comments on the prior art against published applications are limited and there is a time period after publication in which the submission must be made. 37 CFR 1.99. However, this may be avoided for unpublished applications under 37 CFR 1.291, but a petition is required. Further, such a submission against the application of a competitor allows the patent applicant to amend his claims in order to avoid the submitted prior art, thereby strengthening the patent instead of invalidating or narrowing it. Third parties can also retain the resulting prior art for later use in negotiation or litigation. In addition, 18-month publication traditionally has occurred in foreign jurisdictions so that U.S. patent applications that are also filed in foreign countries are currently published. This limits the impact of the change in U.S. Patent Law.

Technology categories 63(1), 63(2) to 63(N), which can be based on the patent Office classifications, are predetermined categories to which prior art request 60 is assigned. Categorizing prior art requests 60(1), 60(2) to 60(N) enables them to be viewed by assigned categories. In this way, the number of prior art requests 60 that user 15 views can be limited to those requests 60 which match his technical interests. As a result, user 15 has a greater chance of having knowledge of preselected requests 60 that, in turn, increases his chance of identifying relevant prior art. Examples of relevant technology categories 63 are as follows: business methods (and, as sub-categories, advertising and marketing, consumer rewards, finance, insurance, on-line auctions, selling and purchasing, and search engines), software, computer, electrical, telecommunications, biological, chemical, mechanical, medicine, dentistry, automotive technology, plant patents and design patents. User 15 can also choose an "all technologies" category 63 in order to view all prior art requests 60; the "all technologies" category can also be a default. This invention is not limited to the designation or quantity of technology categories 63, for which numerous lists can be derived or determined according the most efficient approach to organizing prior art requests 60. In addition, the categories 63 can change over time and increase with added or "hot" technologies (for example, "Y2K" solutions as a separate technology category). Also, some prior art requests 60 can involve multiple technology categories 63 and can therefore be assigned to each of the multiple categories. For example, if request 60 has electromechanical subject matter, it can be assigned to electrical and mechanical categories 63. Technology categories 63 can be defined and implemented in many ways and this invention can be applied in the framework of any of these definitions or implementations such that an exact definition or implementation of technology categories 63 does not limit this invention. Also, in alternative embodiments, technology categories 63 can be eliminated so user 15 views all prior art requests 60.

The technology description 64 can be a plain language description of the subject technology. In one embodiment, the subject technology can be based on the claims of a patent. Patent claims are written in a highly stylized manner. Therefore, the general public, or even people with knowledge of the technological subject matter often do not readily understand them without assistance of a patent attorney or a court. Such assistance is called claim interpretation. Based on claim interpretation, a claim for use in request 60 can be rewritten in plain English to reduce ambiguity. In addition, the parts of the claim (also called "elements") can be organized into clearly labeled subsets or other approaches can be taken to provide a technology description 64 which is more readily understood by user 15. In addition, the rewrite can take into account claim elements for which prior art need not be found because it is already known. This can occur, for example, when prior art has already been found, or has been admitted as prior art in the patent itself, prosecution history or during litigation, etc. In addition, figures can be added where they can assist user 15 in understanding the technology description 64. In alternative embodiments of this invention, technology description 64 can be one or more patent claims themselves or any other type of description which provides user 15 with the information for which prior art is sought. The breadth, format or contents of technology description 64 does not limit this invention.

The latest date for prior art 66 is the date on or before which prior art must be publicly available (called a public availability date). The latest date 66 can be governed by the earliest filing date to which the subject patent 62 is entitled. The earliest filing date is determined by applying the Patent Law statute 35 U.S.C. 102 and the case law that interprets it. The earliest filing date is the filing date of the application on which the patent is based or an earlier or foreign application for which priority is claimed. If the actual invention was made before the filing date, the applicant can "swear behind" the filing date by up to one year. Thus the process of determining the date may not be straightforward. Nevertheless, once the earliest filing date for the subject patent 62 is determined, the latest date for prior art 66 can be the day before that date. The latest date 66 can be provided to user 15 without a detailed explanation in order to avoid burdening user 15 with how it is determined and whether there are alternative arguments for different dates. Rather, sponsor 74 of prior art request 60 can determine the latest date 66 and include a statement in request 60 that any responsive prior art must be dated on or before that date. Alternatively, the definition of the latest date 66 can be varied. For example, in order for the latest date 66 to match the earliest filing date for the subject patent 62, the latest date 66 can be defined as the date before which prior art must be dated. Therefore, the determination of the latest date 66 and how it is presented in prior art request 60 do not limit this invention.

As noted above, the latest date 66 can be earlier than the filing date of a subject patent 62 or its related applications based on earlier conception and reduction to practice dates, as determined based on 35 U.S.C. 102 and the case law that interprets it. For example, an earlier or later date, a range of dates (as one example, different dates can be used for different parts, such as elements, of the technology description 64) or no date can be provided in request 60. However, it is likely that the latest date 66 will be the earliest filing or priority date so that earlier dates are not made public in request 60. Moreover, in alternative embodiments, a latest date for prior art 66 can be excluded from request 60. The result of such exclusion is that all prior art is solicited regardless of their public availability dates. This can be useful because post-latest date 66 prior art can describe the historical development of the patent subject matter or support the view that the subject matter was not available before the latest date 66, etc. In further alternative embodiments in which the latest date 66 is excluded, a standard can be provided in a general instruction section of web site 16 or in request 60. An example of a standard is that prior art must be dated more than one year prior to the earliest filing or priority date of the subject patent 62. Therefore, this invention is not limited by the use or selection of the latest date for prior art 66.

The post date 68 and the close date 70 for request 60 can be the start and end, respectively, of when responses 120 to request 60 are accepted in order to be considered for a reward. In addition, the reward amount and date 72 is an amount for a monetary or other reward and a date on which the reward for one or more closest responses 120 will be announced and/or paid. Also, the amount 72 or type of reward can vary. For example, the reward can be a monetary award of $5,000 for each of the two closest responses 120 with the earliest submission dates. In alternative embodiments, a single reward of $10,000 can be paid to one winning user 15. Further alternative embodiments can include any amount for a monetary award and any number of winners. Also, this invention includes other types of rewards, such as products or other non-monetary gifts, gift certificates, recognition, etc. The number, amount or type of reward does not limit this invention.

Request 60 can also include the identity of sponsor 74 as web site 16 or a third party. In alternative embodiments, sponsor 74 can be listed as anonymous or the identity of sponsor 74 can be excluded. Moreover, in alternative embodiments, the post date 68, the close date 70 and the reward date 72 can be excluded. For example, the timing of the close and reward dates 70 and 72, respectively, can be standardized for each prior art request 60 and, provided in a separate general instruction section of web site 16 or implemented by the presence or absence of request 60 on web site 16.

FIG. 4 illustrates a web page for an example of prior art request 60 according to an embodiment of this invention. The identification number 61 is XX,XXX (i.e., a generic reference number). The subject matter of request 60 is subject patent 62, European Patent Application Publication 0955071 A2, based on European Patent Application 99108984.8, to Richard A. Gamble, James Williams Moriarty and Cheryl Milone Bab (the inventor of this application). The technology category 63 is mechanical. The technology description 64 includes claim 1 of the patent application broken down into a background section (which is called a preamble) and elements (a) to (c). The latest date for prior art 66 is May 7, 1998. The post date 68 for request 60 is Jan. 1, 2000. The close date 70 is Feb. 1, 2000. The reward amount and date 72 is $5,000 paid on Mar. 1, 2000 for each of the two closest responses 120 with the earliest submission dates (actual or reward submission dates depending on whether users 15 are subscribers) and including prior art documents which describe each element (a) to (c) in the context of the background. Also, web site 16 is sponsor 74.

Figure 5:
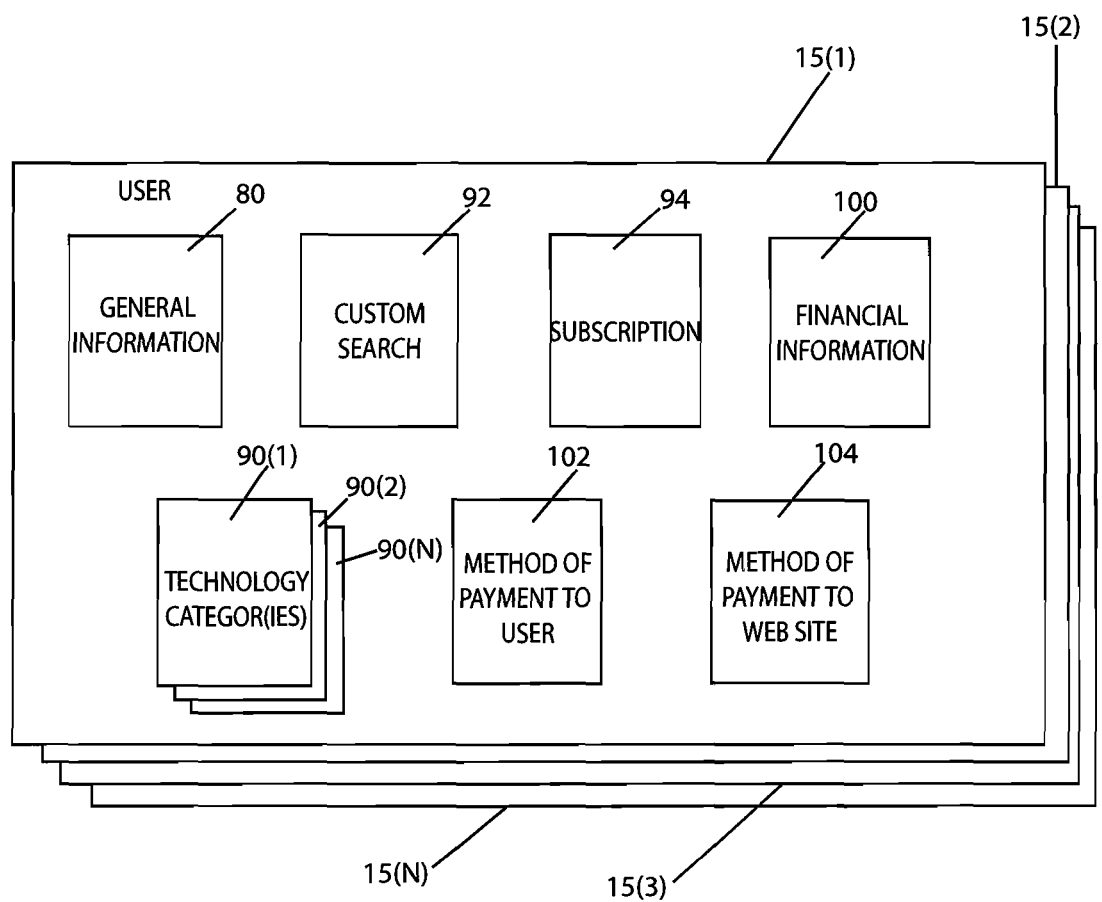
FIG. 5 shows a database that contains data for multiple users of the web site.

FIG. 5 shows a database which contains data for multiple users 15(1), 15(2) to 15(N) according to an embodiment of this invention. The information for each user 15 can include the following: general information 80 about user 15; technology categor(ies) 90(1), 90(2) to 90(N); custom search 92; subscription status 94; and, financial information 100, including a method of payment 102 from web site 16 to user 15 and a method of payment 104 from user 15 to web site 16. User 15 can enter the information on a registration form of web site 16 or transmit the information to web site 16 by any transmission method.

FIGS. 6A-6D illustrate web pages for a registration form 81 for user 15 according to an embodiment of this invention. The information shown in FIG. 5 is requested on form 81. General information 80 can include, as shown in FIG. 6A, the user's full name; contact information, including an E-mail address, postal address, telephone and facsimile; log in name; password and a hint for refreshing user 15's memory about his log in and/or password. The full name, log in name and password can be required in this embodiment. General information 80 is basic information for web site 16 to establish and manage user's 15 account. In alternative embodiments, additional, reduced or alternative information can be requested and/or required. This invention is not limited by the quantity or type of general information 80 that is requested for user registration.

Technology categories 90 selected by user 15 are further described based on the continuation of form 81 shown in FIG. 6B. User 15 is asked to select one or more technology categories 90 in order to display a subset of all prior art requests 60 which match the selected categories 90. An example of the categories 90 is shown in FIG. 6B and the categories can match the technology categories 63 (described regarding FIG. 3) which can be assigned to each prior art request 60. The categories 90 and 63 are merely examples; this invention is not limited by the quantity or type of technology categories 90 or 63. In addition, as part of the registration form 81, fee based services such as custom searches 92 or subscriptions 94 can be offered to user 15. These services can enhance the efficiency of user 15 in reviewing requests 60 and increase his opportunity to win rewards. In this embodiment, the selection of technology categories 90 is free in order to maintain the free culture of the Internet. However, in alternative embodiments, the selection can be fee based. For each of the fee based services 92 and 94, the form 81 can include terms about activation of the service upon receipt of payment by web site 16, methods of payment and continuation of payments to web site 16. Examples of these terms are shown in FIGS. 6B and 6C. However, the implementation of fee-based services, including relevant terms, can vary widely. Accordingly, the terms or approaches shown in FIGS. 6B and 6C or described herein do not limit this invention.

Custom search 92 (as shown in FIG. 6B) enables user 15 to customize his pre-selection of prior art requests 60 for display. For example, user 15 can enter a particular search for relevant terms or phrases (i.e., term searches) that can be applied to patents or other searchable documents on which prior art requests 60 are based. If the search identifies patents or other documents, prior art requests 60 corresponding to those patents or documents can be displayed to user 15 as a subset of all prior art requests 60. An example of a fee for a term search is $25 per month. The inventor or assignee of a patent on a prior art request 60 can also be a basis for pre-selecting requests 60. An example of a fee for an inventor or assignee search is $1,000 per year. In this embodiment, proper names of individuals, companies or other entities can be excluded from the term search option so that term searches do not achieve the same result as the inventor or assignee searches. The method of searching for patents based on terms, inventors or assignees is well known to those of skill in the art and will not be described further herein. This invention is not limited to the manner in which prior art requests 60 are displayed or pre-selected by user 15. Also, user 15 need not set up custom search 92 or this search need not be offered by web site 16. In alternative embodiments, other types of custom searches 92 can be offered or user 15 can have the option of preparing his own custom searches 92, which can then be implemented by web site 16 (at a fee, for example, of $2,000 per year). The use of custom searches 92, the type of searches 92, the amount of the fees or the absence of fees for searches 92 do not limit this invention.

A subscription 94 can also be included as another fee-based service for registration, as shown in the FIG. 6C continuation of form 81. Users 15 can decline a subscription 94 option in this embodiment. User 15 who accepts subscription 94 can receive the following benefits: first, prior art requests 60 can be sent directly to user 15 by E-mail in order to provide immediate notification. Second, any responses 120 which user 15 submits to prior art requests 60 can be predated for purposes of determining winning responses 120 by a predetermined time frame based on a schedule of subscription fees. For example, for fees of $25, $50, $75 or $100 per year, responses 120 submitted by a subscribing user 15 are predated by 1, 2, 3 or 4 weeks, respectively. As a result, for subscribing user 15, the actual submission date of response 120 is not used to determine winner(s). Rather, the predated submission date, called a reward submission date, is used. The effect of subscription 94 can be illustrated as follows: suppose there are two responses 120 to a particular request 60 and each response 120 includes the same prior art, has the same actual submission date and is otherwise the same for purposes of determining a winner. However, one of the respondents is a subscriber at the $25 dollar level while the other respondent is not a subscriber. For determining a winning entry, the reward submission date of the subscriber is one week prior to the actual submission date. For the non-subscribing user 15, the actual submission date is used to determine winner(s). Accordingly, the subscribing user 15 would win the reward. In addition, a request by user 15 for a subscription 94 can be implemented after a predefined period of time, for example, 3 months from receipt of payment by web site 16. This is preferable because if subscriptions were immediately activated, a response 120 would immediately receive a predated reward submission date. This would enable user 15 to become a subscriber 94 only when he has valuable responsive prior art, thereby defeating the advantage for existing subscribers 94. In alternative embodiments, the subscription 94 can take effect immediately. In further alternative embodiments, the receipt of prior art requests 60 by E-mail can be free or cost other amounts and/or predating responses 120 to establish reward submission dates can cost other amounts. Further, user 15 can limit the number of requests 60 received by E-mail based on, for example, the pre-selected technology categories 90, custom searches or other mechanisms. The use, type or implementation of subscription 94 described and shown in FIG. 6C do not limit this invention so that excluding subscription 94 or altering its implementation is contemplated as being within this invention.

In addition, financial information 100 can be requested in the registration form 81 shown in FIG. 6D. The financial information 100 can be divided into a method of payment 102 from web site 16 to user 15 or a method of payment 104 from user 15 to web site 16. The payments 102 to user 15 section can further include a password request for an account established in user's 15 name on web site 16 and specific instructions for methods of payment. The payments 104 from user 15 section can include options such as the use of checks or credit cards and information about the selected option is requested. Methods for executing financial transactions over the Internet are well known to those of ordinary skill in the art and are design choices for which there are various well known approaches such that they do not limit this invention. In addition, payments 102 or 104 can be made to or from, respectively, third parties rather than web site 16.

Figure 7:
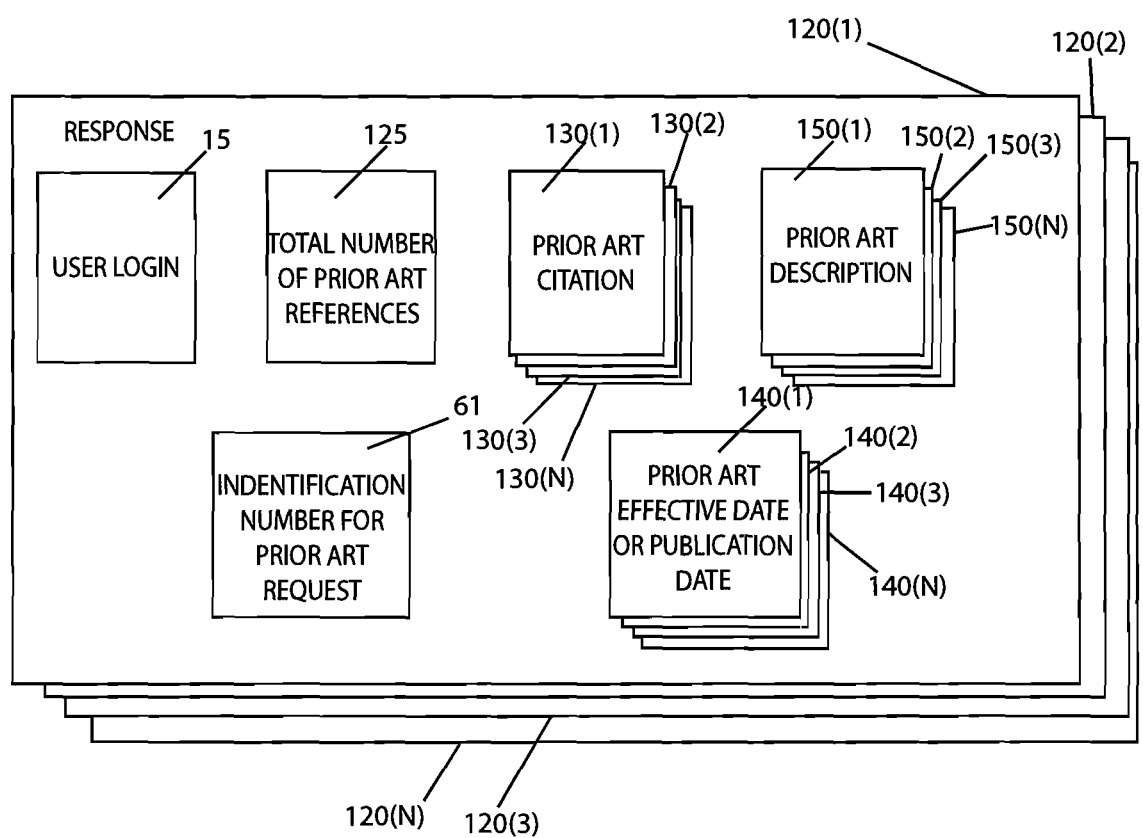
FIG. 7 shows a database which contains data for responses to prior art requests.

FIG. 7 shows a database which contains responses 120(1), 120(2), 120(3) to 120(N) to prior art request 60 according to an embodiment of this invention. Each response 120 can include the following information: a log in for user 15 who provides response 120; a prior art request 60 identification number 61 for which response 120 is submitted; the total number of prior art references 125; and, for each prior art reference, the identification of the prior art reference 130 (also called a prior art citation), the public availability date of the prior art reference 140 and a description of the prior art reference 150. As shown in FIG. 7, multiple prior art references (1), (2), (3) to (N) can be included in a single response 120. For each of the prior art references included in a single response 120, data 130, 140 and 150 can be requested. In alternative embodiments, such information need not be included. Rather, a copy of the prior art references need only be received by web site 16. The approaches for accepting responses 120 can vary so that the approaches described and/or shown herein do not limit this invention.

FIGS. 8A to 8C illustrate web pages for a form 81 for response 120 according to an embodiment of this invention. As described regarding FIG. 2, response 120 can include a first phase 122, which provides information for each prior art reference, and a second phase 124 which provides a full marked version of the prior art references identified in the first phase 122. The FIGS. 8A to 8C show a response 120 example that includes three prior art references. General information 15, 61 and 125 for the first phase 122 is shown in FIG. 8A; information 130,140 and 150 for each of the three prior art references is shown in FIGS. 8A, 8B and 8C, respectively; and, an indication of the status of the submission of the actual prior art documents 124 is shown in FIG. 8C. The first phase submission 122 can include a user 15 section in which the user's log in name or other user identification is requested. In alternative embodiments, various approaches to identifying user 15 can be implemented or the identity of user 15 need not be included in form 81 since user 15 has already logged in and can automatically be associated with response 120. The first phase information 122 can also include an identification number 61 or other reference data for prior art request 60 for which it is submitted. In alternative embodiments, the identification number 61 can be automatically based on the last request 60 viewed or it can be excluded from form 81. Data 125 is the total number of prior art references included in response 120. Data 130, 140 and 150 can be requested in the remainder of the first phase 122 to response 120. As shown in the FIGS. 8A to 8C, in the form for response 120, this data is requested for each prior art reference on a single web page form 81. More particularly, for each prior art reference, this data can include a list of information as follows: if the prior art reference is an article or other publication, the title, author or company 130 and the public availability date or the date that the article was published or publicly known 140 (called the "publication date" in FIGS. 8A to 8C); if the document is a patent or patent application, the patent number and title 130, and the "issue date," "publication date" and "filing date" 140 (which is information cited on the cover of a patent that is well known to those skilled in the art); and, a description of "what the prior art describes" or the sections of text or figures of the prior art reference which teach each element of request 60. In alternative embodiments, the amount and type of information requested about prior art references can vary. Preferably, enough information is requested to sufficiently identify each of the prior art references. In addition, the description of what the prior art describes 150 can be requested in order to verify that user 15 had a basis for citing the prior art reference at the time of submitting form 81. Further, the section for a description of the prior art can be required for any document over 10 pages, for example, a textbook, in order to avoid an unreasonable burden on the party reviewing the responses 120 of having to analyze the entirety of a lengthy document for relevant prior art. In alternative embodiments, identification of prior art references without an explanation of relevance can be used to simplify the response 122. Besides the identification of each prior art reference, the additional information requested in response 122 is not required and therefore does not limit this invention. In alternative embodiments, the prior art reference need not even be identified but, rather, can be submitted by transmittal to web site 16 or another transmission method.

An example of an approach for response 124 is shown in FIG. 8C. User 15 is asked to select whether or not document (s) 124 is submitted with information 122. For example, an electronic version of the prior art reference can be sent with responsive information 122. If a document 124 does not accompany responsive information 122, user 15 is reminded that it must be received within a predetermined period of time from the actual submission date (not the predated reward submission date based on user 15 being a subscriber 94). Transmission methods and alternative embodiments for response 120 are described regarding FIG. 2. Neither the contents of response 120 nor the methods of transmission of information 122 or document 124 limit this invention.

Figure 9:
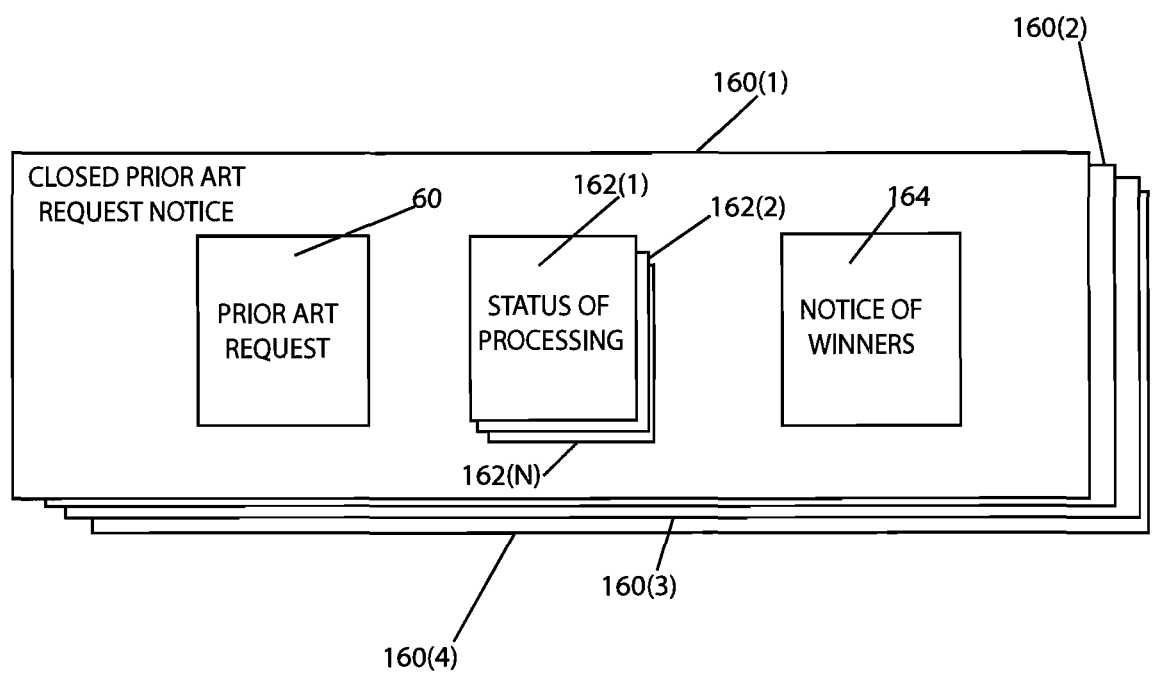
FIG. 9 shows a database that contains data for closed prior art request notices.

Upon the close date or the date after which responses 120 will no longer be accepted for request 60, a closed prior art request notice 160 is posted on web site 16. FIG. 9 shows a database which contains data for closed prior art request notices 160(1), 160(2), 160(3) to 160(N) according to an embodiment of this invention. Notice 160 can include the following information: prior art request 60 on which notice 160 is based; the status 162 of processing responses 120 such as, processing receipt of information 122 or document 124 or processing winning responses 120 (multiple responses 162 (1), 162(2) to 162(N) are expected); and, a notice with information about winners 164. In an alternative embodiment, notices 160 can include this information appended to requests 60. The amount of information in the closed notice 160 does not limit this invention and notice 160 can be omitted from web site 16. Also, citations of the winning prior art references or identities of winning user(s) 15 can be limited or excluded. Additional notices 160 about the use of the information concerning request 60 and responses 120 to execute transactions can be provided in relation to the request. Also, information about rewards can be excluded since rewards need not be offered.

Figure 10A:
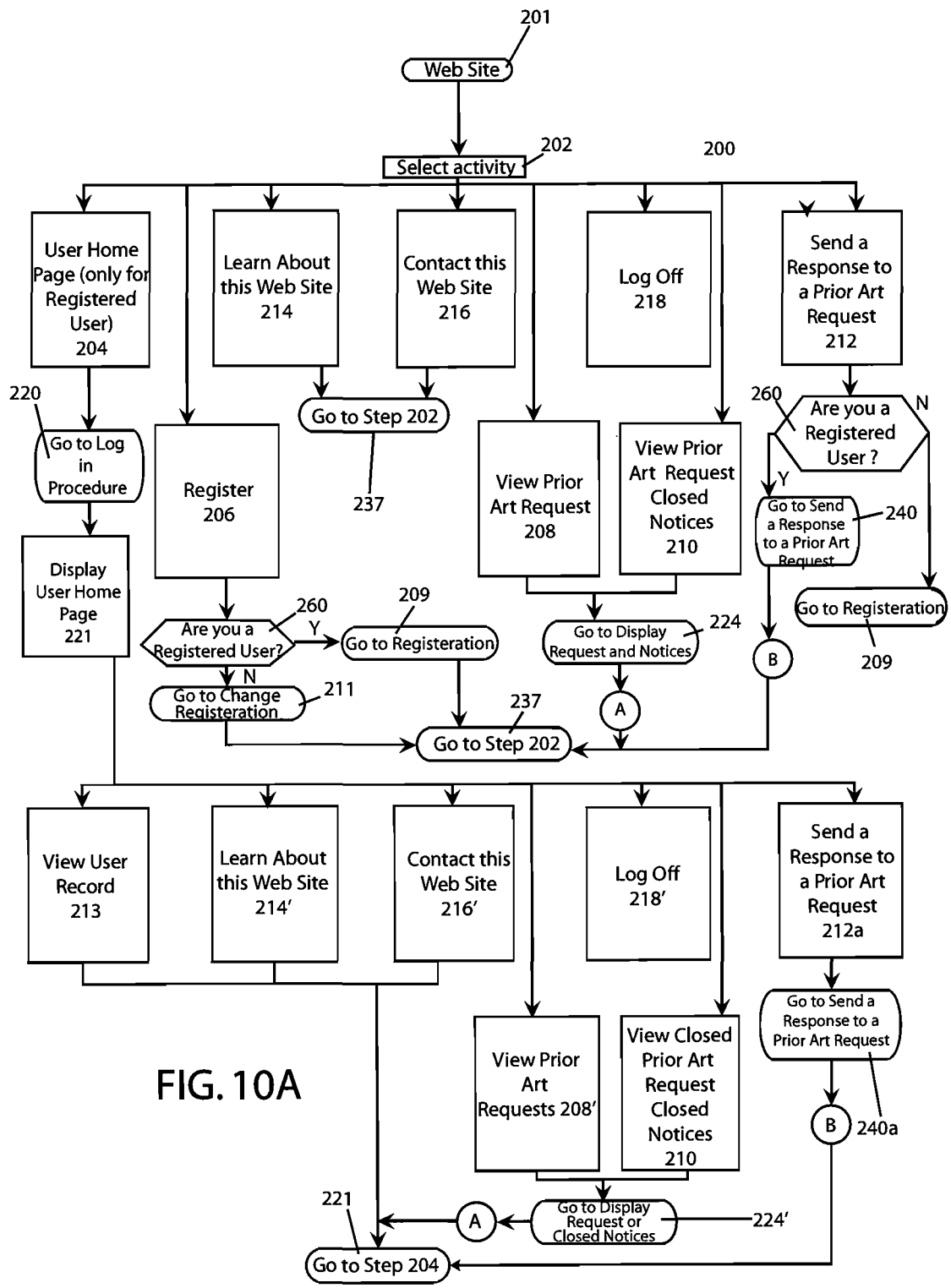
FIGS. 10A to 10C show flow charts of a detailed processing flow for users accessing the web site.

FIGS. 10A at 10C show flow charts of a detailed processing flow 200 for users 15 accessing web site 16 according to an embodiment of this invention. Processing flow 200 represents the posting of prior art requests 60 and procedures for users 15 to respond to requests 60 on web site 16. However, processing flow 200 is merely an example of various processing flows that can be used to implement this invention and, therefore, does not limit this invention.

Figure 10B:
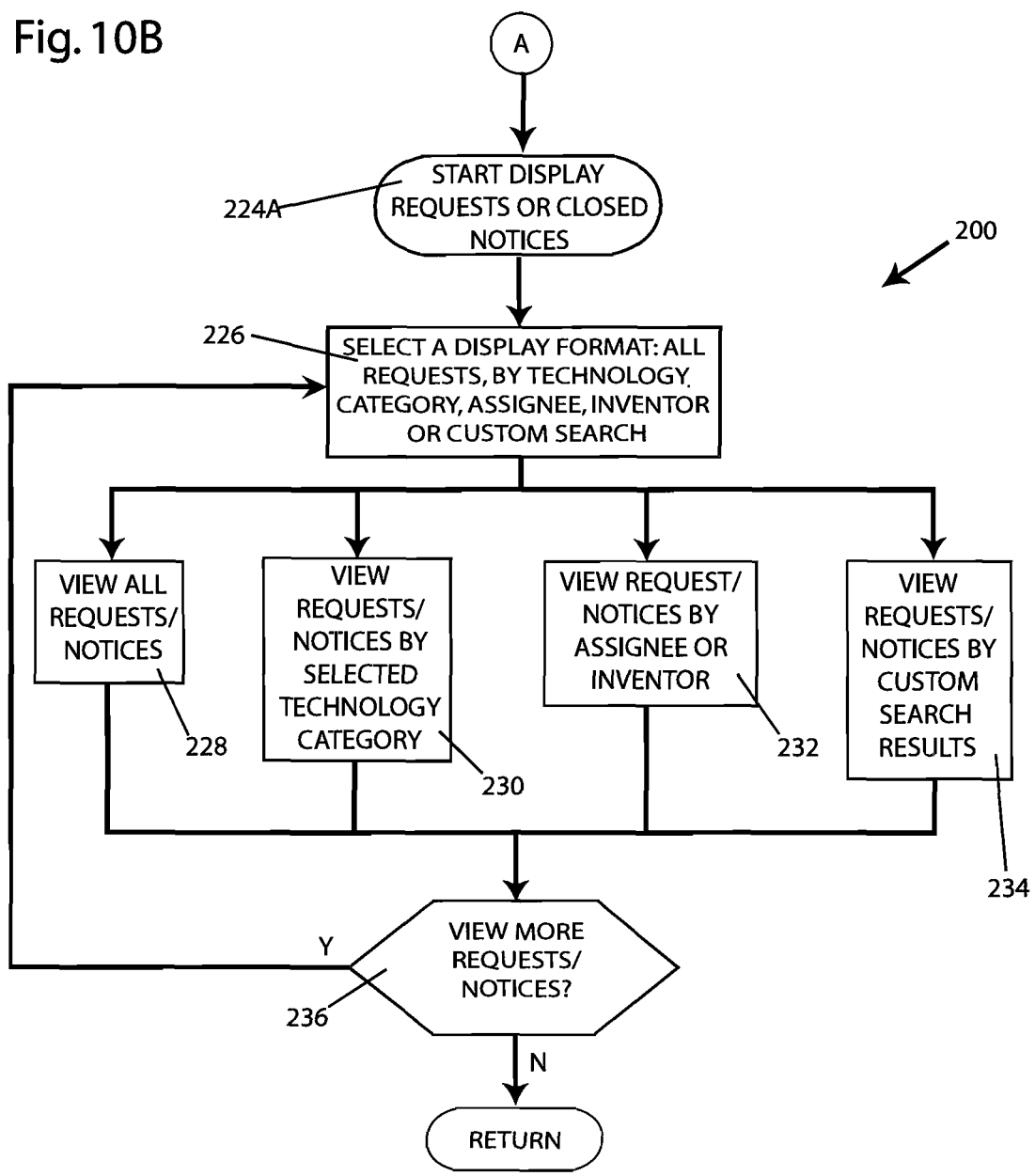
Figure 10C:
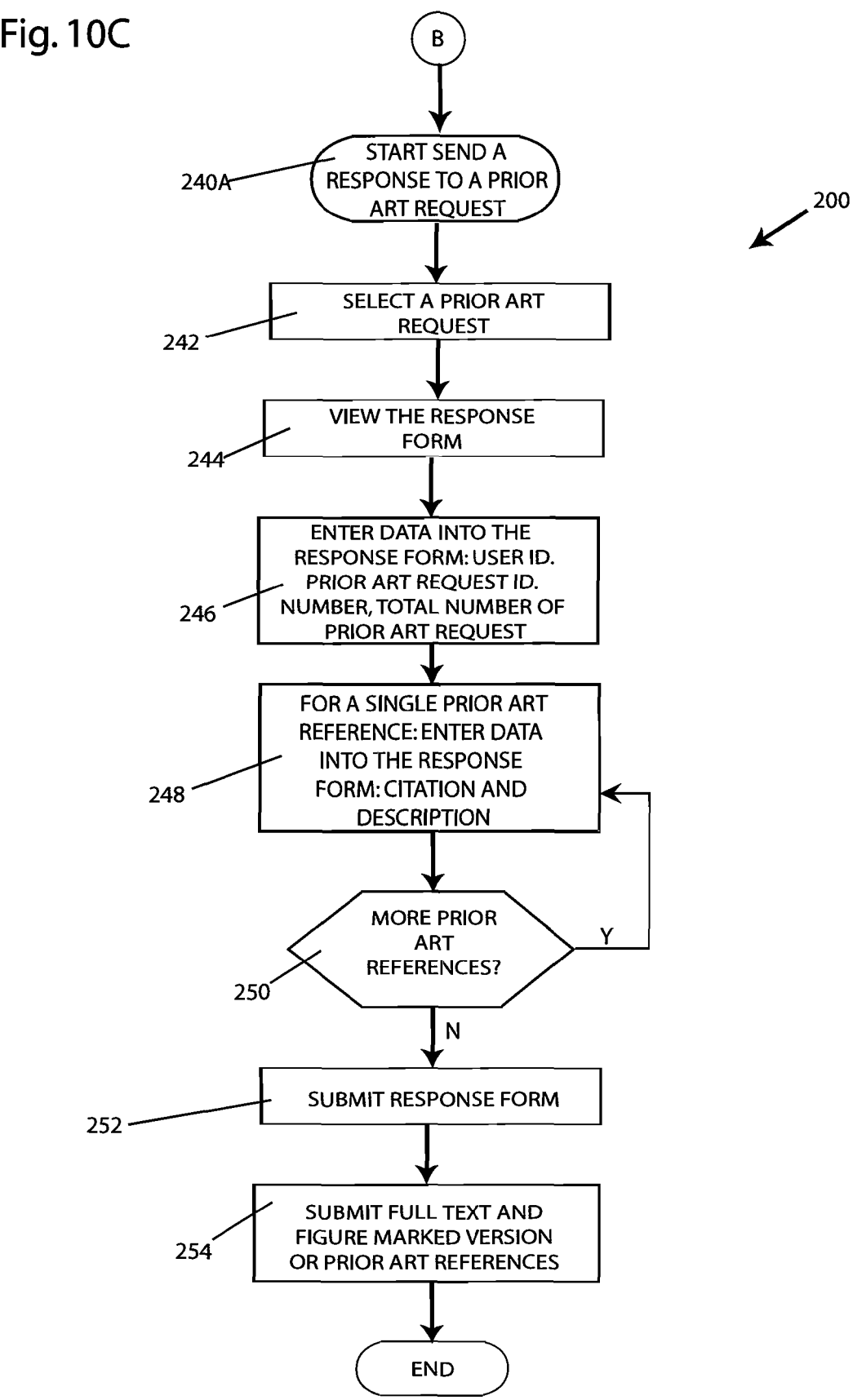

In the FIGS. 10A to 10C embodiment, once user 15 gains access to web site 16 (step 201), user 15 can select from a number of activities (step 202). Examples of the activities are as follows: go to the user home page (step 204), which is only available for registered users 15; register (step 206); view prior art requests 60 (step 208); view closed prior art request notices 160 (step 210); send response 120 to prior art request 60 (steps 212 or 212A); learn about web site 16 (step 214); contact web site 16 (step 216); and, log off (step 218). Upon accessing a user home page through step 204, which is available after user 15 has registered, steps 204, 208', 210', 212A, 214', 216' and 218' are available. Upon initially accessing web site 16 through step 202, steps 204, 206, 208, 210, 212, 214, 216 and 218 are available. The steps marked with (') are the same as those without it. The (') only indicates that the step was reached through the user home page.

Therefore, steps 208, 210, 214, 216 and 218 are available both for user 15 who does not have a home page, i.e., user 15 who has not registered with web site 16, as well as user 15 with a home page, i.e., user 15 who has registered with web site 16 and therefore has a log in and password. This is because, in this embodiment, web site 16 supports access to prior art requests 60 and closed notices 160 by user 15 who has not registered with web site 16 in order to support the open culture of the Internet. Requiring user 15 to register before viewing requests 60 and notices 160 could deter use of web site 16. Also, the user home page can be generic or customized. Such customizations are well known to those of ordinary skill in the art and will not be further described herein. In addition, in further alternative embodiments, there need not be duplicative options for user 15 accessing web site 16 with or without accessing the user home page because a home page need not be provided.

Processing from the user page is described as follows: access to the user home page (step 204) can require user 15 to log in (step 220). If the log in procedure is successful, the user home page is displayed (step 221). In the event that the user's log in fails, an error message can be posted (not shown) and user 15 can be returned to the select activity option (step 202).

Selection of steps 208' (view open prior art requests 60) or 210' (view closed prior art request notices 160) can trigger the same process, called the "go to display requests 60 or closed notices 160" procedure (step 224A, as shown in FIG. 10B). This is because, in this embodiment, prior art requests 60 are tracked by the same identification number 61 while they are open for responses 120 and after they are closed. Once request 60 is closed, notice 160 can merely replace or be appended to request 60 so that request 60 and notice 160 postings are available in a single web page. In alternative embodiments, requests 60 and notices 160 can be displayed on separate web pages. The display "requests 60 or closed notices 160" process is initiated (step 224A of FIG. 10B) by asking user 15 to select one of the following display options: all requests, by technology category, assignee, inventor or custom search (step 226). Requests 60 or closed notices 160 are then presented in the selected display format (steps 228, 230, 232 or 234). In alternative embodiments, instead of selecting the display format in step 226, user 15 can automatically be presented with a display format selected during registration. User 15 is then given the option of viewing more requests 60 or closed notices 160 (step 236). If user 15 answers in the affirmative, he is returned to step 226 to select a display format; if he answers in the negative, the process is completed and user 15 is returned to step 224' of FIG. 10A, Step 224' can originate from FIG. 10A steps 221 and steps 208' or 210' based on step 204. Also, step 224 can originate at step 202 directly through steps 208 or 210. Where step 224, 224' follows step 202 or 221, then processing continues with step 202 or 221, respectively.

When step 212A is selected, the user home page includes the option of submitting response 120 to prior art request 60. More particularly, the "go to send response 120 to request 60" procedure is triggered (steps 240 and 240A, as shown in FIGS. 10A and 10C, respectively). Step 240A is initiated by asking user 15 to identify request 60 to which he is responding (step 242). The electronic response form 81 can then be displayed (step 244). Then, user 15 can enter the following information on the form: a log in name or other user identification, the relevant request 60 and the total number of prior art references for response 120 (step 246). Next, user 15 can enter information about a single prior art reference on the form (step 248). User 15 can then be asked if there are any more prior art references for inclusion in response 120 (step 250). If there are more prior art references, user 15 can enter information about the next prior art reference by returning to step 248. This process continues until information about each prior art reference is entered on the form (steps 248 to 250). In the FIGS. 8A to 8C embodiment, information about each prior art reference is entered on a separate web page of form 81 with the total number of web pages being equal to the total number of prior art references. In alternative embodiments, the format of presenting such information on web site 16 is a design choice that does not limit this invention. If there are no more prior art references, then user 15 can submit the electronic response form 81 to web site 16 (step 252). As described regarding FIGS. 8A to 8C, information about the prior art references can be called a first phase response 122. Also, where full version marked prior art references are required for response 120, user 15 can submit them electronically with form 81 (step 254). The full version marked documents are the second phase 124 of the response 120. Upon completion of step 254, user 15 is returned to processing flow 200 step 240 or 240A of FIG. 10A. Step 240 can originate from FIG. 10A step 260, while step 240A originates from 212A. Where step 240 or 240A follows step 202 or 221, respectively, then processing continues with step 202 or 221, respectively. Step 212A varies from step 212 in that, since user 15 must be registered in order to access the user home page, step 212A does not include a request for registration status or a prompt of the registration process for an unregistered user 15.

User 15 can also view his records for responses 120 to prior art requests 60 (step 213) as an option from the users home page (step 221). More particularly, user 15 can view the status of responses 120 for requests 60 or the status of rewards or other results for closed notices 160 to which user 15 has responded. The data displayed to user 15 about each request 60 to which he has responded can include the following: prior art request 60 identification number 61; the reward submission date of response 120 (predated based on a subscription 94 status); the actual submission date of response 122 for purposes of determining whether response 124 is timely; confirmations of receipt and acceptance or rejection of response phases 122 and 124; the status of processing for selection of winners; a notice of any rewards paid to user 15; and, any information about other winning users 15 for any prior art request 60 to which user 15 has responded, etc. In alternative embodiments, the data displayed to user 15 can exclude any of the items mentioned above or data need not be shown for each user 15. Upon completion of step 213, user 15 can be returned to his home page (step 221).

The user home page (step 221) can provide three additional options: learn about web site 16 (step 214'); contact web site 16 (step 216'); and, log off or exit web site 16 (step 218'). These features are well known to those of ordinary skill in the art and will not be discussed further herein. Upon completion of step 214' or 216', user 15 can be returned to his home page (step 221). Further, user 15 can exit web site 16 by selecting step 218'.

From the select an activity step 202, user 15 can select any of steps 206, 208, 210, 212, 214, 216 or 218 in addition to the user home page step 204. Steps 208, 210, 214, 216, and 218 have been described above based on their selection from the user home page (step 221). Their selection from step 202 triggers the same processing flow as from step 221. However, upon completion of each step 206, 208, 210, 212, 214, 216 or 218 originating from the select activity step 202, user 15 can be returned to the select activity step 202.

In this embodiment, steps 206 and 212 are available only from step 202. Step 206 is a registration option which triggers a registration process, including registering for the first time or changing registration data (steps 260, 209 and 211). The registration process can include displaying the registration form shown in FIGS. 6A to 6D in which user 15 can enter or change registration data. In alternative embodiments, other registration approaches, including alternative displays or procedures, are design choices known to those of ordinary skill in the art so that the approach described herein does not limit this invention.

For step 212 processing, user 15 is first asked whether he is registered (step 260). In the event that user 15 is registered, the go to send a response 120 procedure is triggered (step 240). This procedure has been described above based on its selection from the user's home page (step 212A). In the event that user 15 answers in the negative to the step 260 question, then user 15 is notified that he must register in order to submit response 120 and he is directed to the registration process. Once user 15 has completed the registration process or sent a response 120 process (step 240), he is returned to the select activity step 202. In alternative embodiments, user 15 need not be registered in order to submit responses 120.

Figure 11A:
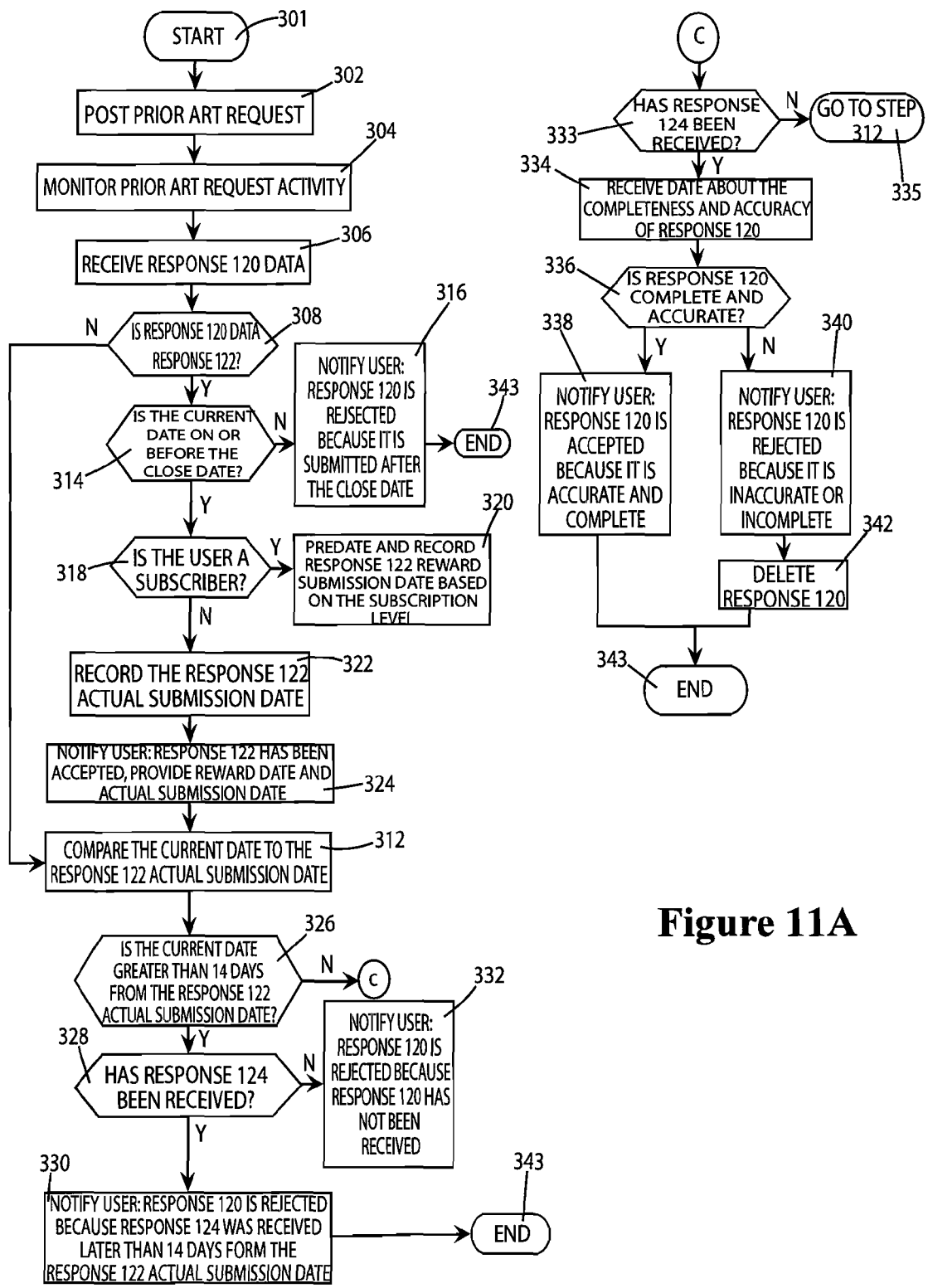
FIGS. 11A to 11B show flow charts of detailed processing flows for the web site for a single prior art request.
Figure 11B:
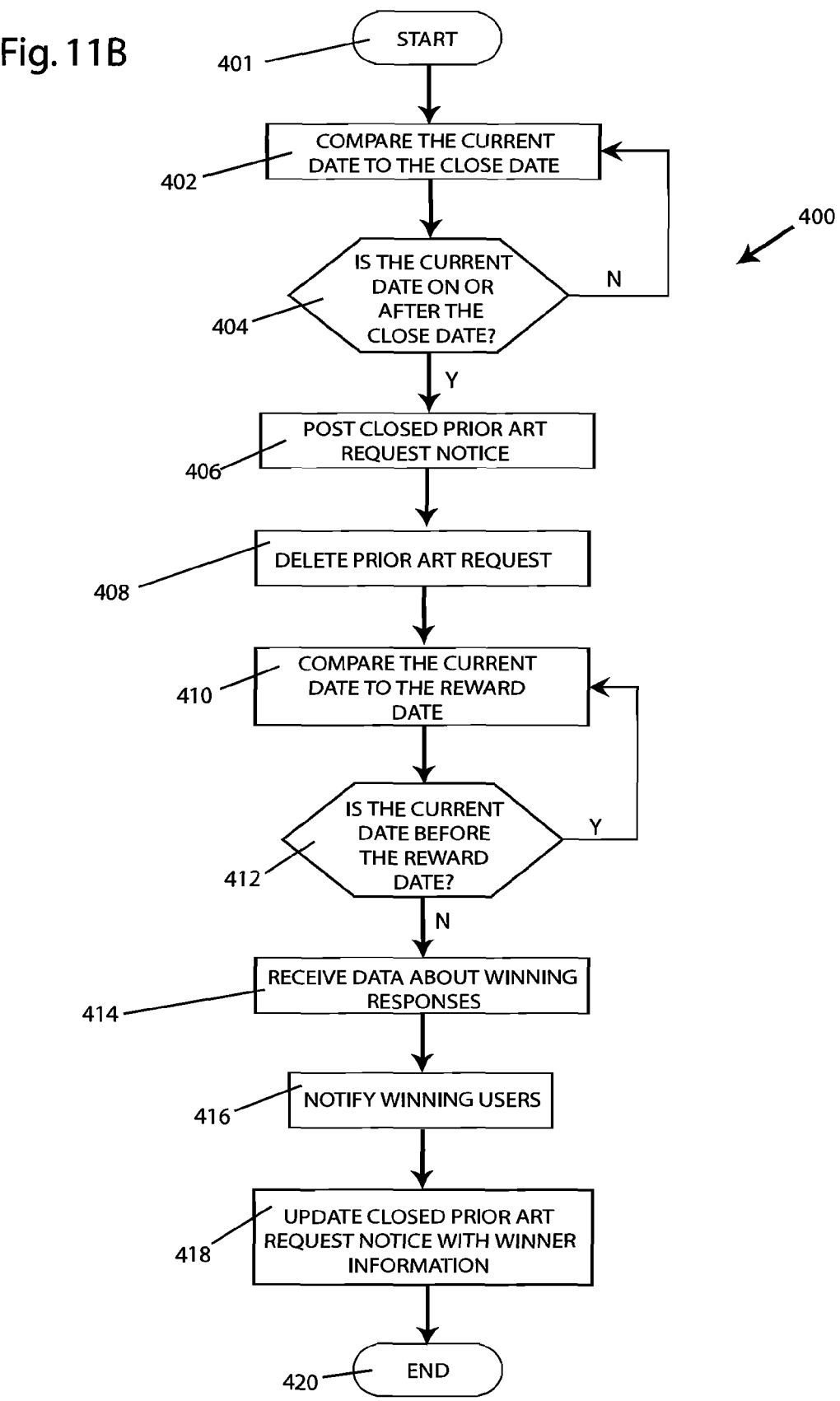

FIGS. 11A to 11B show flow charts of detailed processing flows 300 and 400 for web site 16. FIG. 11A shows the processing flow 300 for a single response 120 to a single prior art request 60. FIG. 11B shows the processing flow 400 for closing request 60 and posting the results. Processing is initiated (step 301) by posting a single prior art request 60 on web site 16 (step 302). An exemplary posting is shown in FIG. 4. After posting request 60, it is available for display to multiple users 15 of web site 16. As an alternative the request 60 may be sent to registered users, e.g., by e-mail. Computer 20 (operating based on a processor 22 under the control of a program) which supports web site 16 then monitors data entered by such users 15 for a submission of a response 120 to request 60 (step 306). In this embodiment, user 15, administrators or other employees of web site 16 enter the data described in FIGS. 11A and 11B. For example, web site 16 employees can enter data from response 120, including phases 122 and/or 124 received by mail, facsimile or other transmission method. In addition, web site 16 employees can make entries as to the accuracy and completeness of response 120 based on their manual review of the phases 122 and/or 124 of response 120. In further alternative embodiments, web site 16 can include software to evaluate the accuracy and completeness of response 120.

The processing initiated by receipt of data for a single response 120 to request 60 is now described. The same processing can occur for each response 120(1) to 120(N). Computer 20 first determines whether response 120 data is received (step 306). Response 120 data can be either general information (i.e., the first phase 122 of the response, shown in FIGS. 8A to 8C) or full version marked prior art references (i.e., the second phase 124 of the response 120, shown in FIG. 8C). Computer 20 then determines whether response 120 data is for a first phase 122 (step 308). If the answer to the question in step 308 is negative, then response 120 data is for a second phase 124 of the response. In this case, computer 20 initiates processing of step 312, as described below. Alternatively, computer 20 can be notified that the prior art 124 has been transmitted based on the receipt of a "yes" response to the portion 124 of form 120 (shown in FIG. 8C) or a separate data entry by a web site 16 employee based on receipt by a transmission method outside web site 16, such as by facsimile, hand delivery, postal mail, etc. The method of determining the type of response 120 data does not limit this invention.

If response 120 data is for the first phase 122 based on an affirmative answer to the question in step 308, then computer 20 determines whether information 122 has an actual submission date which is on or before the closed date 70 (step 314). If the answer to the question in step 314 is negative, then user 15 is notified that response information 122 is not to be accepted because it is after the closed date 70 for acceptance of responses 120 to request 60 (step 316). The receipt of a late response of prior art can be returned unread; or it can be used without a fee being paid. In the event that the late response includes good prior art, than it can be kept and a fee be paid, even that it is late. If the answer to the question in step 314 is affirmative, then computer 20 determines whether user 15 who submitted the response 122 is a subscriber (step 318). If user 15 is a subscriber, then the submission date for response 122 for purposes of winning a reward is automatically pre-dated based on the subscription level and recorded as the reward submission date (step 320). Where a subscriber submits after the actual close date, but upon applying the users' reward submission date. If so, the system may chose to treat the submission as timely. Where user 15 is not a subscriber or upon completion of step 320, computer 20 records the current date as the actual submission date for response 122 for purposes of determining whether response 124 is timely (step 322). Computer 20 then notifies user 15 (for example, by e-mail and/or posting a notice to user 15 on web site 16) that response 122 has been accepted and notifies user 15 of the applicable reward and actual submission dates (step 324). In this embodiment, a review of information 122 for accuracy and completeness is not performed at this time because the full version marked prior art references have not yet been received, so a final comparison cannot be performed. In alternative embodiments, a review of responsive information 122 can be performed at this time for any discernible errors.

Further processing at step 312 is triggered by any one of three events. First, processing step 312 can be triggered by a negative answer to the question in step 308 so that the response 120 data 122 is for a marked prior art submission 124. Receipt by web site 16 of prior art 124 can include electronic full version marked prior art references or entry of data by an employee of web site 16 to indicate that response 124 has been received, such as by facsimile, postal mail, etc. Second, step 312 can also be triggered by completion of step 324. In this way, when both phases 122 and 124 are received by web site 16 at the same time, prior art 124 is processed after the completion of the processing of the information 122. Third, step 312 can also be triggered on a daily basis for each responsive information form 122 that has been received in order to determine whether corresponding prior art 124 has been received within the predetermined period of time from the actual submission date. However, this daily execution of step 312 can be discontinued after either step 330 or 334 has been executed, i.e., either the time period has lapsed (step 330) or prior art 124 has been received (step 334). For example, in one embodiment as shown in FIG. 8C, the predetermined period of time is 14 days. Therefore, the prior art 124 must be received by web site 16 within 14 days of the actual submission date in order for response 124 to be timely received and, therefore, accepted by web site 16. In an alternative embodiment, responsive information 122 can be deemed to be a complete response 120. In this case, web site 16 employees can obtain copies of the prior art references cited in responsive information 122. Also, in this case, there would be no need for further processing as shown in step 312 et seq. for timely receipt of full version marked prior art references.

In one embodiment in which 14 days is used as the predetermined period of time by which prior art 124 must be received after the actual submission date of responsive information 122, step 312 includes comparing the current date to the actual submission date of information 122. Computer 20 then determines whether the current date is greater than 14 days from the actual submission date (step 326). If the answer to the question in step 326 is affirmative, then the time frame in which to receive response 124 has passed. Computer 20 then determines whether the corresponding prior art 124 has been received (step 328). Receipt of prior art 124 in this embodiment means receipt by web site 16 of the full version marked prior art references in contrast to merely a notification that such documents have been sent. In an alternative embodiment, a notification can be sufficient for response 120 to be accepted. If full marked versions have been received after the 14-day period, computer 20 notifies user 15 that response 120 is rejected because full version marked prior art references were received after the 14 day period (step 330). On the other hand, where prior art 124 has not been received, web site 16 notifies user 15 that response 120 is rejected because the full version marked prior art references have not been received within the 14-day period (step 332). If the answer to the question in step 326 is negative, then the 14 day time period in which to receive response 124 has not lapsed. Computer 20 then determines whether prior art 124 has been received (step 333). If the prior art 124 has not been received, then the processing flow 300 is returned to step 312 for processing the next day. In this way, the loop of steps 312, 326 and 333 will continue until response 124 is received or the predetermined time period in which web site 16 must receive prior art 124 lapses. Where the answer to the question in step 333 is affirmative, then computer 20 pauses until web site 16 employees enter data about the accuracy and completeness of phases 122 and 124 (step 334). In this embodiment, the analysis to generate data for step 334 is performed by web site 16 employees or a third party sponsor because it requires a case-by-case study of responses 122 and 124. In alternative embodiments, computer 20 can include software for processing a portion of or the complete analysis. Computer 20 then determines whether phases 122 and 124 are accurate and complete based on the data entered in step 334 (step 336). If the answer to the question in step 336 is affirmative, then computer 20 notifies user 15 that response 120 is accurate and complete and is therefore eligible for a reward (step 338). If the answer to the question in step 336 is negative, then computer 20 notifies user 15 that response 120 based on phases 122 and/or 124 is inaccurate and/or incomplete and user 15 is therefore not eligible for a reward (step 340). If response 120 is rejected, computer 20 can then delete response 120. Execution of any of steps 316, 330, 332, 338 or 342 ends the processing flow 300 (step 343).

FIG. 11B illustrates the processing flow 400 for closing request 60 and posting a closed request notice 160 about the status and results, including winner(s) of request 60. At the same time as computer 20 processes flow 300, computer 20 also monitors the current date (for example, on a daily basis) in order to trigger processing flow 400 the day after the closed date for request 60. Computer 20 initiates processing 400 (step 401) by determining whether the current date is on or after the close date 70 (step 402). If the answer to the step 404 question is negative, then web site 16 returns to processing step 402. This establishes a loop that can be executed on a daily basis. If the answer to the question in step 404 is affirmative, then web site 16 posts a closed request notice 160, which can include request 60, a statement that no more responses will be received and that responses 120 are being processed (step 406). Computer 20 can then remove prior art request 60 from being posting on web site 16 (step 408).

Computer 20 then processes the reward by comparing the current date to the reward date (step 410) in order to determine whether the current date is before the reward date (step 412). If the answer to the question in step 412 is negative, then computer 20 returns to processing step 410. This establishes a loop that can be executed on a daily basis until the current date is the reward date. If the answer to the question in step 412 is affirmative, then computer 20 can receive data identifying the winner(s) of request 60 (step 414). Computer 20 can then notify the winning user(s) 15 of their winning status (step 416) and update the closed request notice 160 to include information about the reward, winner(s) and winning response 120 based on permission from the winner(s) and sponsoring party to post such information (step 418). Processing flow 400 is completed upon execution by computer 20 of step 418 (step 420).

The concept of posting a request also can be combined with an investment strategy to execute an investment based on the information acquired through the search request results and subsequently analyzed. The investment can derive from an anticipated change in the valuation of a financial instrument to which the acquired information is relevant. The type of request and information sought can be determined based on the highest probability that the outcome and/or acquired information, whether maintained privately or publicly disclosed, will impact the valuation of the related financial instrument. The timing and type of investment can be effected by the timing of the request posting, analysis of submissions to win the reward or fee (as in a finder's fee search), determination of a winner and/or disclosure of a winner and/or acquired information on a limited basis, such as for example in a transaction to sell any information related to the requests to at least one third party or to sell the announcement of any related information to a news service such as Bloomberg or Reuters, or publicly, such as for example, by posting any related information on the web site. In an alternative embodiment, an investment strategy can be executed based on a prediction of market impact upon announcement of the request itself, such as for example, in the same manner that an announcement of patent litigation impacts market value as the patent scope is going to be tested. Over time, the web site will become the standard rating system for high profile patents, statistics of invalidating patents can be applied to make such prediction. Any disclosure described in this application or embodied by the invention described herein would be made in accordance with any and all relevant U.S. or foreign statutes including, e.g., by also disclosing the request, the fee, investment strategy and/or investment or any other information in order to fully comply with any and all applicable laws.

One or more investments can be executed or information about the requests can be sold for transactions by third parties (including financial or auction third party transactions or any other purpose) at any number of points in the request process, such as, e.g., before or after the request is posted, during the evaluation of submissions, after the evaluation of submissions, after determining a winner, after declaring the winner (privately or publicly) and/or disclosing the outcome and/or the winning evidence to the public. There are numerous types of investments that can be implemented depending on the subject matter of the request, type of information sought, timing of the request and relevance of the information to a financial instrument etc. Such investments can include equity or bond purchases, derivative investments and options, including puts, calls, long or short sales and/or any other investments through which a profit can be realized by acting on the information acquired through the request and either maintaining the request outcome and/or acquired information privately or disclosing it on a limited basis or publicly. A limited or public disclosure can be made, e.g., by contact with at least one third party investor, a newsletter or a press release or announcements on the web site etc. The scope of this invention is not limited to the investments identified herein but rather includes any investment that can yield a profit based on combining information from a request and an investment. The types of disclosure described herein also do not limit the scope of this invention.

In an embodiment, a request is posted to acquire prior art for a patent involved in litigation in which the valuation of a financial instrument, e.g., an equity, can be impacted if prior art is found. A winner results so that the poster has prior art. An investment is executed based on an anticipated devaluation of the equity upon a limited or public disclosure of the request outcome and/or the prior art. After the disclosure, the investment is completed to realize a profit. More particularly, where a request is posted for prior art to invalidate a patent, a related equity is owned by the assignee, inventor or current owner of the patent (hereinafter, assignee/inventor) and there is a winner, the request poster can anticipate that the value of the equity will decline. As a result, the poster can purchase put options or enter into short sales or purchase any other investment to profit from the limited or public disclosure of the winning outcome and/or evidence. Additional investments derived from the same request can also be executed as part of the investment strategy. For example, another targeted equity can be that owned by a competitor of the assignee/inventor so that the value of the competitor's equity can increase based on a finding that the patent is invalid. Accordingly, the investment strategy can include executing alternate investments (e.g., where the effect on the valuation of the competitor's equity is likely to be greater than on the assignee/inventor's equity), multiple investments (e.g., investing in both the assignee/inventor's and competitor's equities) and/or varying investments for a single equity (e.g., for different disclosures during the request process, such as an initial disclosure of the request outcome followed by a subsequent disclosure of the winning evidence or for different time frames such as short and long term expectations of equity valuation changes). The poster as used herein of a given request can include the administrator of the system of the present invention or any recipient of the acquired information, such as a party who pays to post the request, etc.; the identity of the poster does not limit the scope of this invention.

In another embodiment, a request can be posted to acquire prior art for a patent involved in litigation in which the valuation of an equity can be impacted if the prior art is found and the request outcome and any prior art are maintained privately. A winner results so the poster has prior art. An investment is made which anticipates that the equity will be devalued based on a finding in the litigation that the patent is invalid. The poster maintains the outcome of the posting as a secret and awaits the litigation finding of invalidity. The investment is then completed to realize a profit. This investment strategy does not include an announcement of a winner. Instead, the poster can implement requests that do not involve the disclosure of the outcome of the posting, i.e., whether there is a winner, but rather winners and rewards can be privately managed (and can be conditioned upon a private transaction between the poster and the winner, including contracting with the winner to maintain confidentiality) and the acquired information can be privately held by the poster. Alternatively, the investment strategy can include a public announcement of a winner without public dissemination of the winning information.

In addition, in other embodiments, the investment strategy can be based on a determination that there is no winner. As the process becomes the established method of acquiring categories of information (e.g., prior art of evidence of validity, infringement or non-infringement of patents, trademarks or copyrights etc.), failure to find the information through a request posting can render its existence less likely. For example, where the subject matter of a request is to invalid a patent, failure to acquire prior art can support an argument that the validity of the patent is legitimized or strengthened. Therefore, a profit can be realized by executing an investment based on this non-winning request outcome and either maintaining the outcome privately or disclosing the outcome on a limited basis or publicly. In addition, all of the investment strategies applied to finding prior art in response to a request and investment strategies generally can be applied to this scenario. In alternative embodiments, a request can be posted to acquire information for infringement or non-infringement of a patent or any other type of information for a patent, trademark or copyright, or other subject matter for which a determination is made that the acquisition of such acquired information and/or the limited or public disclosure of the request outcome and/or such information can form the basis for an investment strategy. In one embodiment, for a request to identify whether a patent is infringed, submissions can include information that an infringing device or method does not infringe because it is covered by a prior art patent or the submissions can include a non-infringement or infringement analysis which can be judged by the poster as to whether it meets the legal standards or any other method which will provide information for the issue of infringement or other subject matter. In another embodiment, a request regarding patent validity also can include the evaluation of a legal opinion. Such other subject matter can include other legal, research, financial, political issues etc., or any sought after information attainable through a request for such information.

The identification of the request and/or investment subject matter can be made according to an analysis of the potential profit for an investment based on the relationship of the request subject matter to the valuation of the relevant financial instrument(s), e.g., equity(ies). This invention includes identifying the subject matter of a request posting and a related financial instrument that will support a profitable investment strategy. For example, a patent can be described in public forums such as market analyst reports, company reporting or can be determined by analysis, etc. to be related to the assignee/inventor's company in such a manner that patent validity or infringement impacts the valuation of the assignee/inventor's equity or competitors' equities. Therefore, any investments, investment strategies or models, etc. derived from combining a request with an investment strategy also are inventive and accordingly are within the scope of this invention. Generally therefore, the identification, pricing and timing of one or more investments for one or more equities or other financial instruments relevant to the request subject matter, or models to implement such investments derived from the combination of a request and an investment strategy, are inventive and therefore within the scope of this invention. Therefore, there are numerous variations on the combination of a request posting with an investment strategy based on the acquisition of information and/or outcome of the request whether privately held or disclosed on a limited basis or publicly. All such variations are within the scope of this invention.

In one embodiment, the fee structure for the request can include a percentage of profit based on the investment strategy or any transaction from which value is derived from the request or response(s) or any information about the outcome. In which case, the fee can be adjusted after the additional value for the transaction is realized so that the fee or reward can change during or even after the close of the request, this variable component and its implementation (for example, with updates about increase to the reward during the request processing) can be disclosed on the web site and/or as part of individual requests to which it is relevant.

A request can be combined with an auction process. The request submissions and/or results can be auctioned as a separate process from the request by implementing a request for information and then auctioning the results. This can be done on an individual basis or a group can be formed of one or more requests for which an auction process is implemented, whether or not there is a statement regarding an individual request or for a group about the implementation of an auction. In one embodiment, the requests for information do not include a description of an auction. Whether or not to auction the results is decided as a separate consideration from the request offering to those responding to the request. In another embodiment, the request offering includes a statement that there is an auction associated with the request. In another embodiment, an auction process can be described as part of the general process for request postings that are conducted for each request offering on an individual or group basis.

The timing and/or subject matter of auctions offer numerous variations for the auction process. In one embodiment, the submissions of those who provided information in response to the request can be auctioned at any number of one or more times during the request process, e.g., after a period of time for initial submissions or a predetermined or ad hoc period of time during submissions, at the close of the request process, before a winner is announced and/or after a winner is announced. The results can include all submissions, selected responses (e.g., a predetermined number or ad hoc number of the most relevant submissions or submissions selected by the party who posted the request which may or may not be the same as the service provider of the request) and/or the winning submission(s) for the request. If the auction occurs before an announcement of whether there is a winner, the bidders in the auction process do not know whether there is a winner of the request. In this case, the subject matter of the auction can include the private disclosure to the winning bidder of whether there is a winner and/or the winning submission in contrast to the collection of submissions without an identification of a winner. In another embodiment, where the request submissions are auctioned before the announcement of the outcome, a condition of the auction can be that the winning bidder determine whether there is a winner of the request and can further include the following variations: the winning auction bidder can pay the fee associated with the request or the person who posted the request. Alternatively the service provider and/or auctioneer can pay the fee to the winner, and the winning auction bidder can determine whether to publicly announce the winner or to maintain the information privately. As a result, part of the auction subject matter can be control over the request, its submissions and outcome, who determines the results and whether to publicly announce the outcome, as well as whether the winning auction bidder, request poster, request service provider and/or auctioneer pay for the request reward. In this manner for example, the owner of a high profile patent or its competitors has an incentive to purchase through auction the subject matter of the request process itself in order to control the request, including the public dissemination of the outcome.

The combination of the auction and request processes can impact the request reward. In an embodiment, the request reward can include, in its entirety or as a component, a portion or the entirety of the profit from an auction, an investment or any transaction which derives value from the request, or any information about the request, response(s), sources of response(s), outcome or any information which is common to both the request and a transaction. The reward can be a percentage of the auction profit, e.g., one hundred percent or any percentage of the auction profit, a fixed or variable percentage of the auction profit, the profit minus a commission for the host of the auction or other third party such as the source of the request, a variable percentage depending on various tiers of profitability of the auction, such as a percentage over a fixed amount of profit from the auction, a percentage of a capped profit from an auction. As used herein, the phrase "an auction profit percentage" encompasses any amount or percentage of the profit from an auction as described herein or an amount of money related to the profit from an auction. The reward can also include a base fixed amount in addition to an auction profit percentage or a minimum fixed amount where the auction may not yield an expected profit alone or in combination with the above described variations. The particular type, component or amount of the reward based on the auction profit or auction profit percentage does not limit the scope of this invention.

The auction can be a multi-tiered process timed to correspond to stages in the request process, for example, any one or more of the following stages: upon announcement of the request, upon the close of receipt of responses to the request, upon preliminary assessment of the responses with or without providing information about the preliminary assessment, upon completion of assessment of the responses with or without providing information about the completed assessment, prior to announcing the outcome or whether there is a winner or after announcing the outcome or whether there is a winner. In this manner, there can be several auctions for the same request. The number of auction tiers can be predetermined and announced as part of the request, separately as part of an overall process for the requests generally or can be determined on an ad hoc basis and announced accordingly. Once again, for high profile patents, purchase of a request at earlier stage auctions can be desirable to control the outcome of the request. There can be one auction at any of the stages or there can be multiple tiers for two or more stages, for example, a first tier upon announcement of the request and a final tier at announcement of the outcome including an announcement of a request winner. In another embodiment, the first tier can occur upon a preliminary assessment of the response received prior to the close date of the request with or without reporting of the results, a second tier can be upon completion of the request without an announcement of the outcome and the final tier can occur upon announcement of the outcome, including whether or not there is a winner. The type, timing or number of tiers of the auction does not limit the scope of this invention.

Where there are multiple tiers, the winning auction bidder can apply the winning bid or a percentage or multiple greater than the winning bid to subsequent tiers so interested bidders have an incentive to propose the earliest winning auction bid. In addition, where non-final tiers of a multi-tier auction occur before the announcement of the outcome and/or winner, the part(ies) related to the request and/or auction have the insurance of an auction profit regardless of the outcome of the request. As the efficacy of the request model is proven over time, a mere announcement of a request can produce an auction bidding contest in a preliminary stage with the winning bidder in the tiers prior to the final tier being given multiples of the original bid to apply to subsequent auctions.

In an alternative embodiment, a single auction can occur prior to the outcome determination of the request, for example, upon announcement of the request or at any time, and the winning auction bidder later can receive the responses with or without the disclosure to the winning auction bidder and/or third parties of the outcome (including whether or not there is a winner).

In another alternative embodiment for a multi-tier auction, there can be three tiers timed when an auction can occur at various stages in the request process. For example, in one embodiment, the first tier can be upon an announcement of the request, the second tier can be upon an announcement of a completed assessment including the number of responses received and the number of the responses which are relevant without disclosure of whether or not there is a winner, and the third tier can be upon an announcement of whether or not there is a winner. In this embodiment, the winning auction bid or a multiple of such bid from the first tier can be applied to a subsequent tier or all tiers. The multiple of the non-final auction winning bid can be, for example, the winning auction bid amount plus a percentage of the winning amount (e.g., if the winning bid is $100,000, then the value added amount for subsequent tiers can be $100,000 plus a fixed or variable amount of the winning bid, such as, 10%, 50% or 100% resulting in, for example, values of $110,000, $150,000 or $200,000, respectively). In an alternative embodiment, the value added amount of the winning bid can be determined based on the competing auction bids so that the total subsequent tier value of an earlier auction bid can be increased (or in an alternative embodiment, decreased to encourage the winning bidder to increase his winning bid from his closest competitor's amount) the closer other auction bidders came to the winning amount. For example, where the winning preliminary auction bid is $100,000, the calculation of the value added bid for subsequent auctions can be $100,000 plus the percentage of $100,000 represented by the losing competing bidders. In this example, if the highest competing bidder is $80,000, then the value-added auction bid for subsequent tiers can be $180,000 so competing bidders in subsequent tiers will have to bid more than $180,000 to prevail over the winning preliminary auction bid. There are numerous ways to structure the value-added application of preliminary-tier winning auction bids, this invention is not limited by the particular structure. Another embodiment of the invention is the auction of potentially obtainable information before it is known if the information exists, which can also be referred to as a finder's fee search. A finder's fee search allows the market to value the information. The auction-winning amount can be a component of the finder's fee search amount or can define it entirely (e.g., if the auction is executed before the outcome of the search, the winning amount can be a portion or the entirety of the search fee).

In an embodiment there is a single auction upon an announcement of a request for the information. E.g., information x is sought within a predetermined time frame and the auction is for a bid for the information if it is found.

In another embodiment there are two auctions: There can be a first auction upon an announcement of a request for the information. The winning bidder than gets a percentage increase of the winning bid to apply to the second and final auction, which can occur upon determination of whether the information was found. For example, if the winning bid is $100, it can be increased by 100% or be valued at $200 for the second and final auction. The winning bidder can be required to pay a fee to the auctioneer, e.g., the winning bidder has to pay the $100 even if nothing is found or some percentage of $100 (10%, 20%, 50% etc.)

In still another embodiment there are more than two auctions. Additional auctions can be added with the wining bidder in each auction prior to the final getting percentage increases of his/her bid for application to subsequent auctions. The series of auctions can occur at key times along the finder's fee search process: e.g., upon announcement, after some time where there is an announcement of the number of submissions received so far, after more submissions are received, after all submissions are received (submissions can be rated generally as relevant, within the technology area, highly relevant) with a reporting of the number of submissions in each category and upon announcement of whether there is a winner.

In another embodiment the bids are sophisticated. There are two components to bids in multiple auctions. If there are two auctions, one upon announcement and one upon the outcome announcement, the auction bids at announcement of the finder's fee search have an X and Y component. X is the amount the winning bidder will pay regardless of whether the information is found. Y is an additional amount that is then used in a formula to determine the increased bid for the final auction. If the formula is 2X+(X+Y) (where x must be at least ½y), then the auction bidder adjusts the numbers to maximize his bid. This formula allows the auctioneer a guaranteed profit whether or not the information is found. Any formula can be used to provide for multiple components so the bidder can maximize the premium applied to his winning bid for future auctions and the auctioneer can be guaranteed a return on the auction prior to determining whether the information is available.

In another embodiment there is an auction of only results of the finders fee search, from determining whether there is a winner to keeping the winner and all submissions, with no requirement that they be made public.

In another embodiment there is an auctions for the winning bidder to act as a subscriber under the consulting service part of the business. So instead of being a subscriber for all finder's fee searches, the winner is a subscriber for a particular auctioned off search and gets notice in advance of the public (alternatively, in advance of the public but after the subscribers, or in advance of the subscribers).

In another embodiment there is an auctions for the subscribers so that one of the subscribers to the consulting service can get further advance notice of a particular request ahead of the other subscribers.

As described in the above embodiments of the combination of a request with an auction, both the request process and the auction process can be enhanced by such combination. In the initial instance, the request posting can drive the auction as the creation of auctionable subject matter. However, the auction process also then can drive the request based on, for example, the particular embodiments described herein, the incentives of purchasing the outcome early at a discount and purchasing control over the request outcome and its public dissemination. In addition, to the extent that a portion of the request reward is based on the auction, an increase in auction bid amounts at various tiers will provide further incentive for request searchers to provide submissions for the request offering. Also, in a business venture where the provider of request postings and auctioneer are the same, the problem of relying on third parties to provide subject matter for requests and/or auctions is replaced with self-generating subject matter for both because the auction profit can pay in whole or in part the request reward. As a result, the number of requests for information and auctions can be determined as an autonomous business decision and the costs of attracting third parties for request offerings and/or auctions can be eliminated. In an alternative embodiment, the request and auction offerings can be from a combination of autonomous business decisions and third party offerings. With the self-generation of requests and incentives provided by the combination of requests and auctions, including variations on the type and timing of the auctions and multi-tier auctions, the quantity of requests and auctions can be maximized, thereby drawing more participants to the request/auction than if the request/auction postings were dependent alone upon third party initiation. The number of participants providing submissions in response to the requests and bids in the auction process directly impacts the profitability of the request/auction.

As the efficacy of the request approach is proven over time, a mere announcement of a request can produce an auction-bidding contest on the outcome. As a result, profits from the request/auction combination of structures can be realized as early as an announcement of a request. For requests in which a technology sector is surveyed, the auction can be for the results without there being a winner of the request and the auction bidder can select a predetermined or ad hoc number of the most relevant submissions to the request for division of the auction bid amount (or percentage of that amount with the remainder of the amount being paid as a commission to the request poster/auctioneer) and the request information searchers can be required to pay an entrance fee to minimize request searchers dumping their files in response to the request. In addition, an auction can occur with some review of the responses by the request poster/auctioneer so that some evaluation of the value of the responses is given. Then, a winner can get the auction amount (minus commissions) or the auction amount (minus commissions) can be paid to a predetermined or ad hoc number of request searchers who provide the most relevant submissions, so that the request searchers know that even if their information is not the most relevant, the provision of highly relevant information by another requested information searcher can provide them with profits. In alternative embodiments, an entrance fee can be charged to request searchers regardless of the subject matter of the request to increase the profit base for the request searcher.

In addition, as noted above, a request can be combined with an investment strategy. The addition of an auction component does not impact the request/investment strategy combination so that in an embodiment, a business model can include all three components, i.e., a request combined with both an investment strategy and an auction for particular requests, as part of the request offering or determined on an individual basis for individual requests or groups of requests. Incorporating the investment strategy in some or all of the request/auction combinations can further develop interested request searchers and auction bidders given the additional profitability potential of an investment component. For example, the winning auction bidder can participate in the investment strategy (subject to any and all relevant laws) or a portion of the auction subject matter can be a percentage of the investment strategy profit. In alternative embodiments, the investment strategy execution can be related to the timing of the auction or the two components can be independent of one another. In further alternative embodiments, the auction results prior to the execution of the investment strategy can impact the investment strategy by providing data about the interest in the subject matter of the request for information. The combination of one or both of an investment strategy and/or an auction with one or more requests for information does not limit the scope of this invention. On the other hand, the synergies of combining requests with auctions and/or investment strategies can increase the profitability of the request/auction business model by providing additional opportunities and incentives for request searchers and auction bidders to participate and, as a result, providing more notoriety to facilitate the profitability of the investment strategy. The requests can include searches for prior art, infringement or surveys of the technology in a given field (for example, with the winning request submission(s) being those that provide the most relevant information). Additional variations on request offerings are not limited to the embodiments disclosed herein such as request/auction and request/auction/investment strategy combinations. The combination of investment strategy and/or auction structures is not limited by the type of request offering.

FIGS. 12A, 12B, 13, 14A, 14B, 15A and 15B show flow charts of one embodiment of the detailed processing flows for the web site for the combination of one or both of investment strategies and/or auctions. Multiple and varied investment strategies and auctions are illustrated in these figures. However, these figures represent one embodiment and do not limit the scope of the invention.

Figure 12A:
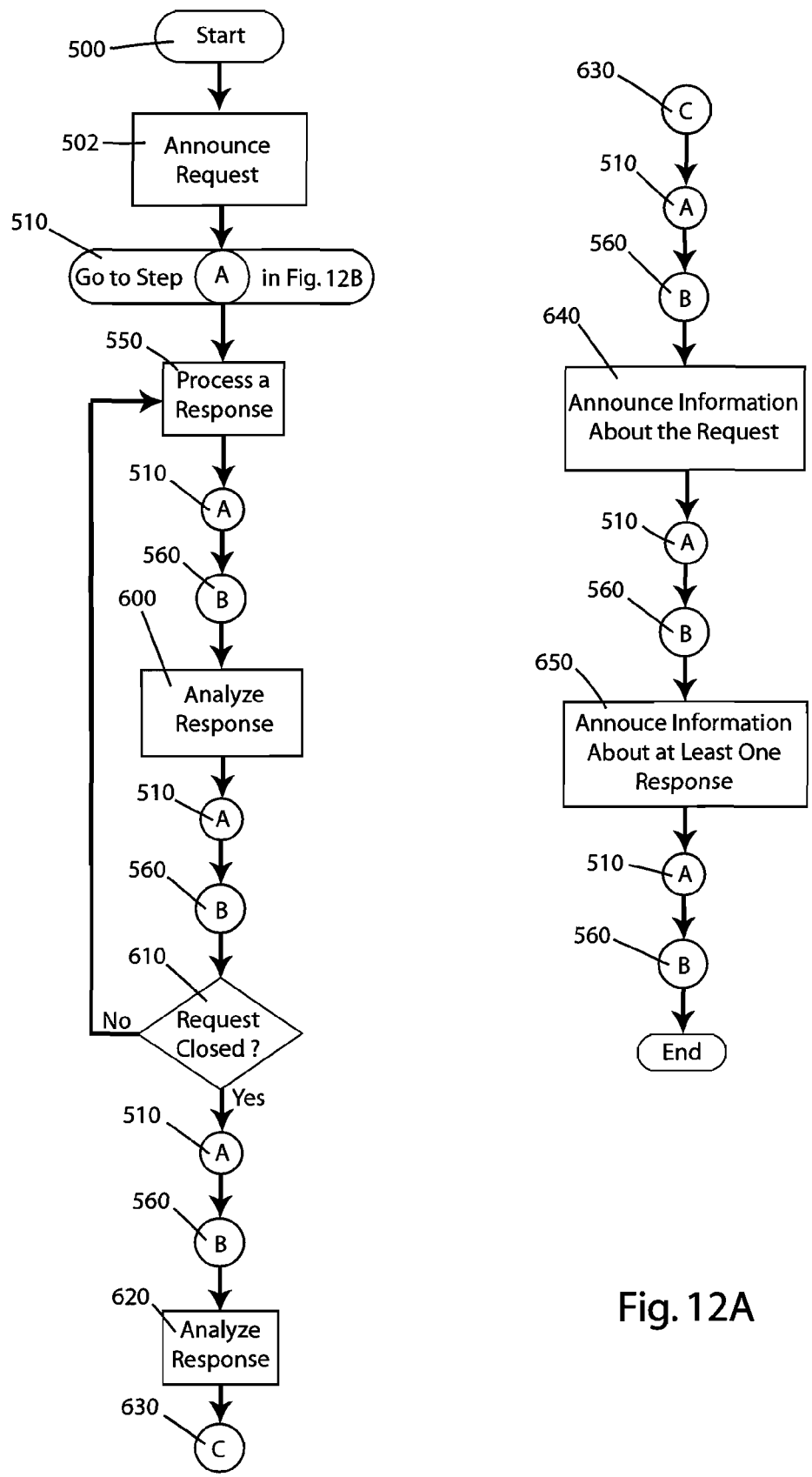

FIGS. 12A and 12B show the general processing for combining a request 60 for information with one or more transactions based on the value of the request 60 or response(s) 120 received in response to the request 60. The process of FIG. 12A is triggered (step 500) by an announcement of a request 60 (step 502). The processing of step A in FIG. 12B is then triggered (step 510). A decision step is executed by computer 20 based on input from a web site user (all decision steps as described herein are executed by a user of website 16 or an individual with access to the host or sponsor of the request system) as to whether the transaction is based on the value of information concerning a request 60 (step 511). If the answer is yes, then a decision is entered as to whether the reward includes a percentage of the value (step 512). If the answer is yes, then the reward information is updated (step 514), if the answer is no, then processing is returned to FIG. 12A. After step 514, a decision is entered as to whether to add the updated reward information to the request 60 announcement. If the answer is yes, then the updated reward information is announced (step 518), if the answer is no, then the processing is returned to FIG. 12A.

Returning to FIG. 12A, a response is processed (step 550). Step A of FIG. 12B is then repeated (step 510). Upon return to FIG. 12A, step B in FIG. 12B is processed (step 560). Step B in FIG. 12B is a decision step as to whether the transaction is based on the value of information concerning at least one response (step 562). If the answer is yes, then processing continues to step 512 (as described above). If the answer is no, then processing is returned to FIG. 12A.

Returning to FIG. 12A, the response is then analyzed (step 600). After which, steps A and B are repeated (steps 510 and 560, respectively in FIG. 12B respectively). Returning to FIG. 12A, a determination is made as to whether the request 60 is closed, for example, the end date for the receipt of responses 120 has occurred and no more responses can be received (step 610). After which, steps A and B are repeated (steps 510 and 560, respectively in FIG. 12B respectively). Returning to FIG. 12A, the responses 120 are analyzed (step 620). After which, steps A and B are repeated (steps 510 and 560, respectively in FIG. 12B respectively). Returning to FIG. 12A, step C is executed, which triggers a repeat of steps A and B (steps 510 and 560, respectively in FIG. 12B respectively). Returning to FIG. 12A, an announcement is made about the request, such as for example, it is completed and the responses are have been analyzed, or some preliminary data about the responses and whether or not there is a potential of invalidating the subject patent (step 640). After which, steps A and B are repeated (steps 510 and 560, respectively in FIG. 12B respectively). Returning to FIG. 12A, a further announcement is made with information about at least one response, including for example, more information about the outcome, the value of any response, information about whether there is a winner, one or more invalidating prior art references, the identification of a winner or winning one or more parts of, or the whole of, at least one response 120 or information derived from at least one response, etc. (step 650). After which, steps A and B are repeated (steps 510 and 560, respectively in FIG. 12B respectively). Processing of this embodiment ends after the return to FIG. 12A processing.

Figure 13:
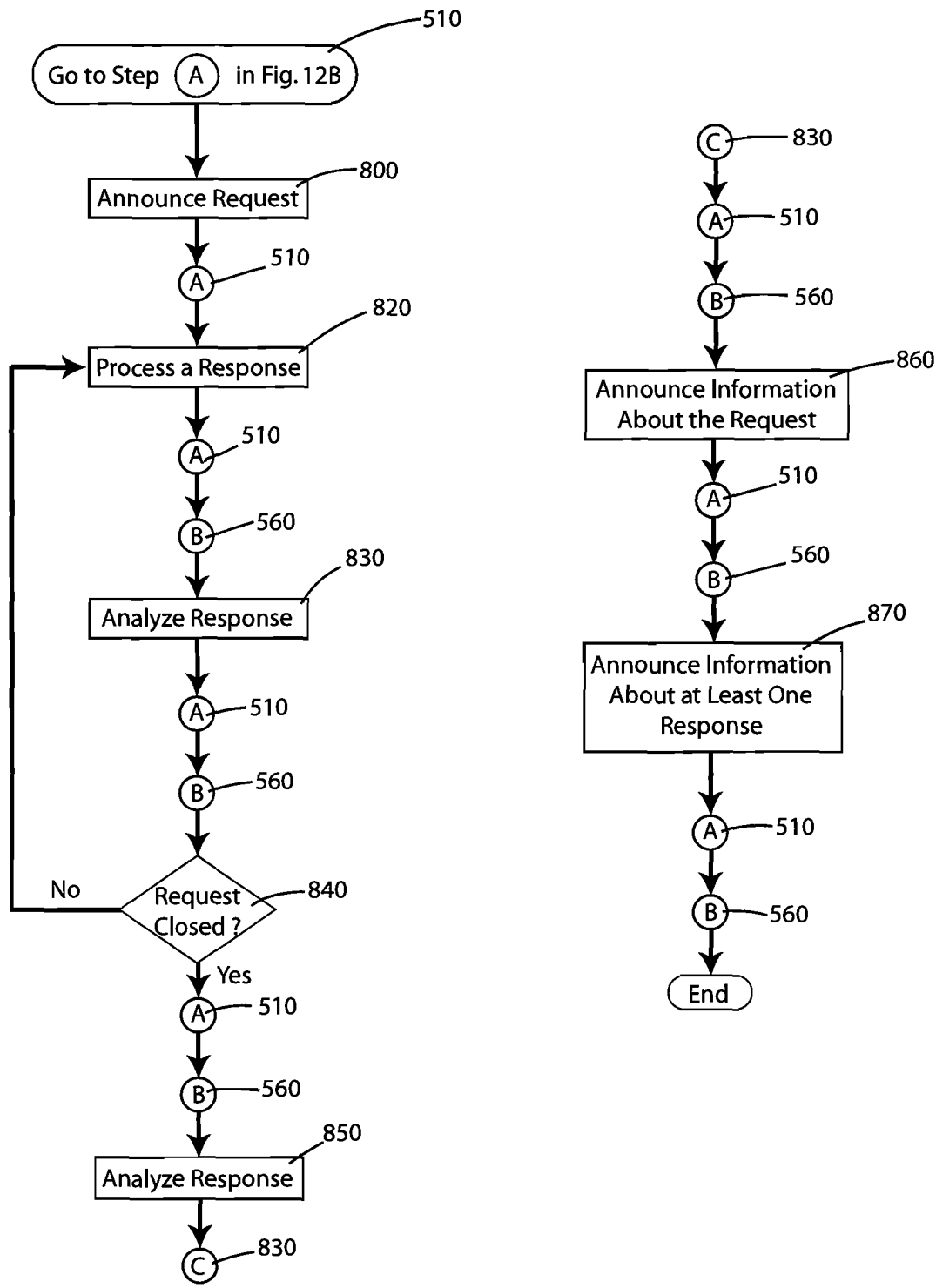

The process of FIG. 13 adds a step before the announcement of a request (step 800). Otherwise, it is the same processing as FIG. 12A with steps 800, 820, 830, 840, 850, 860, 870 being the same as the processing described for steps 500, 550, 600, 610, 620, 640, 650, respectively. The additional step in FIG. 13, step 510 executed before step 800 repeats the processing of step A in FIG. 12B or the processing of a transaction made before the announcement by web site 16 of the request 60.

Figure 14A:
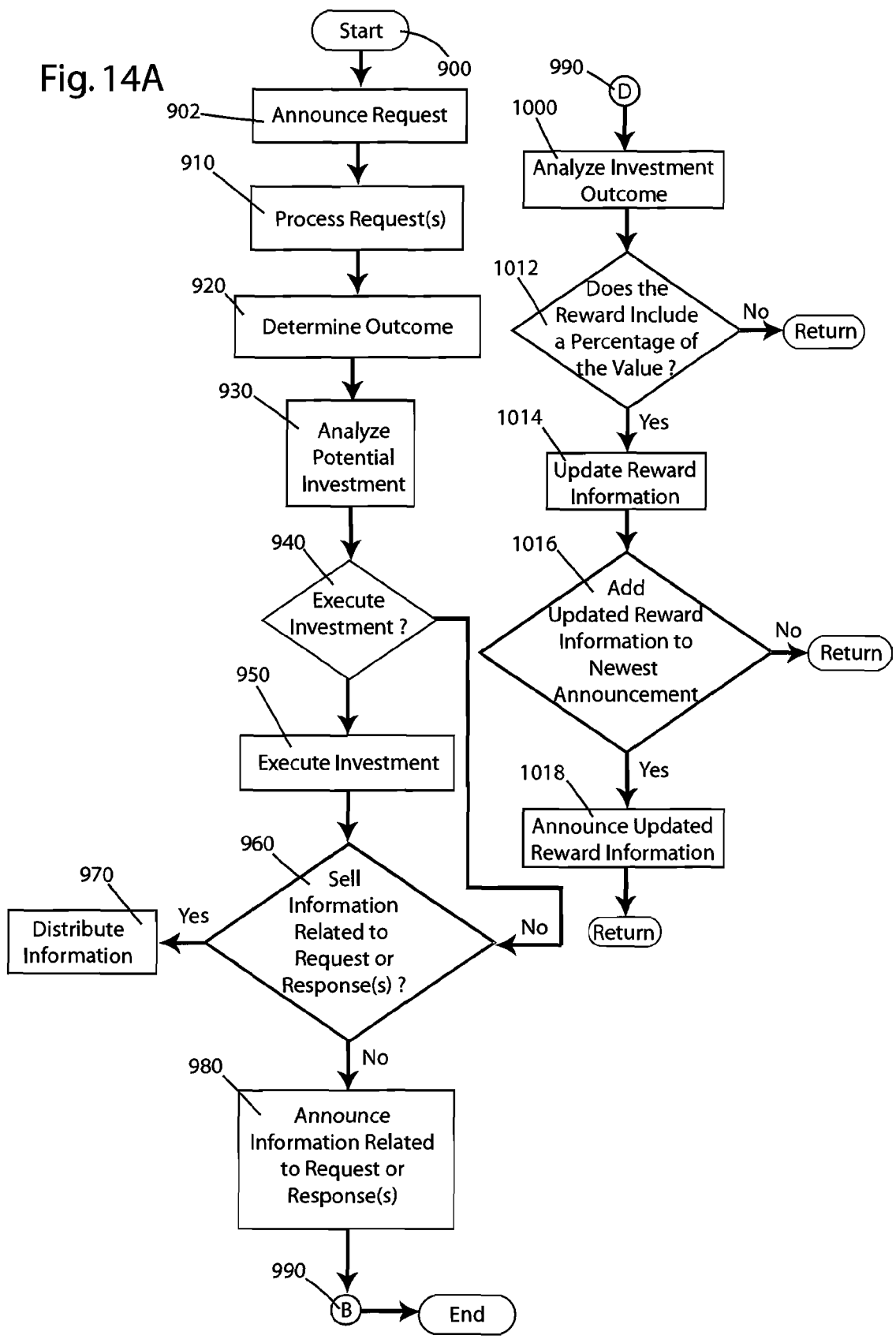
FIGS. 14A and 14B show flow charts of detailed processing flows for the web site for offering requests and executing investment transactions with various timing related to the processing steps of the request, sequences and combinations based on the value of the information concerning the request and/or response(s) to it.
Figure 14B:
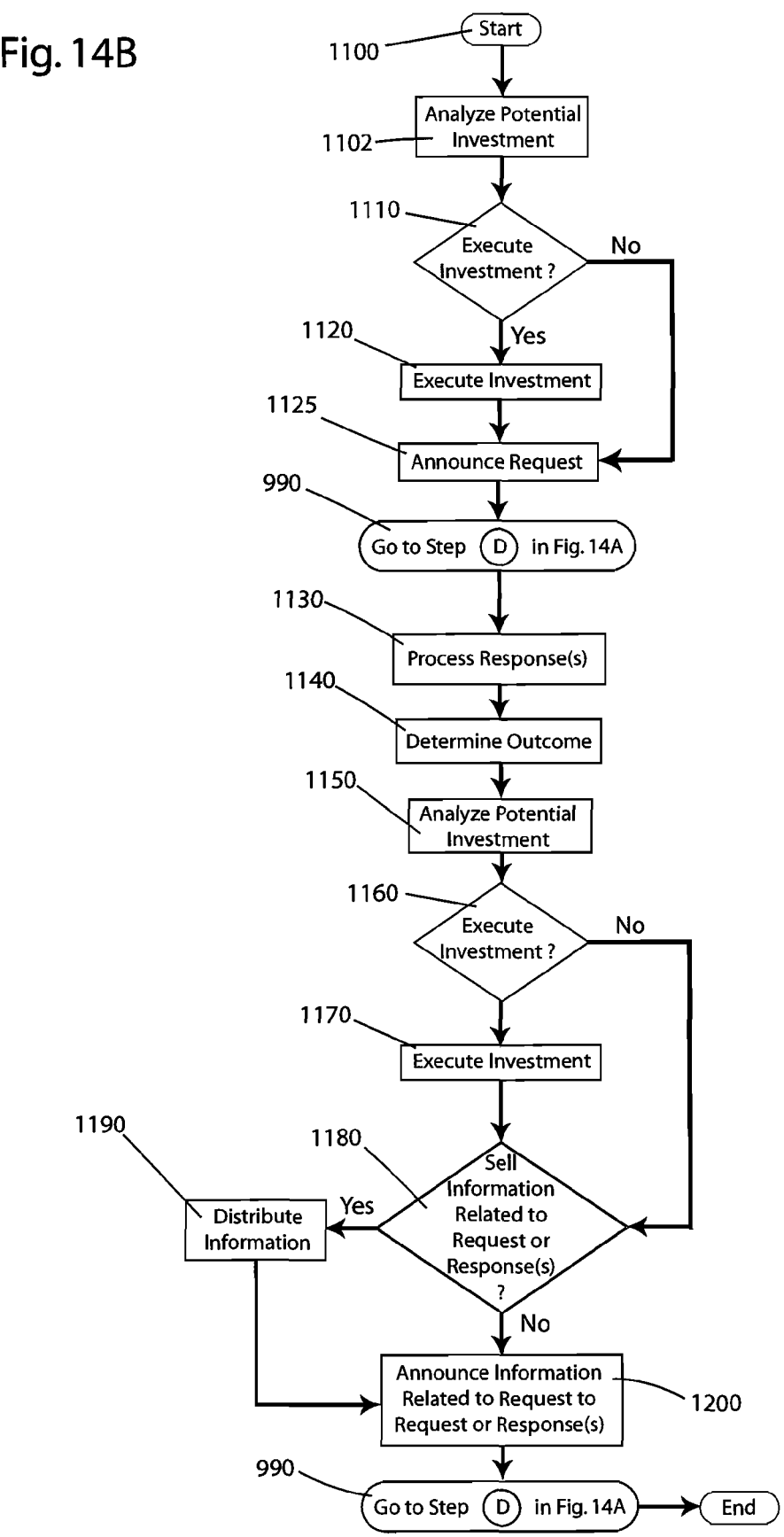
Figure 15A:
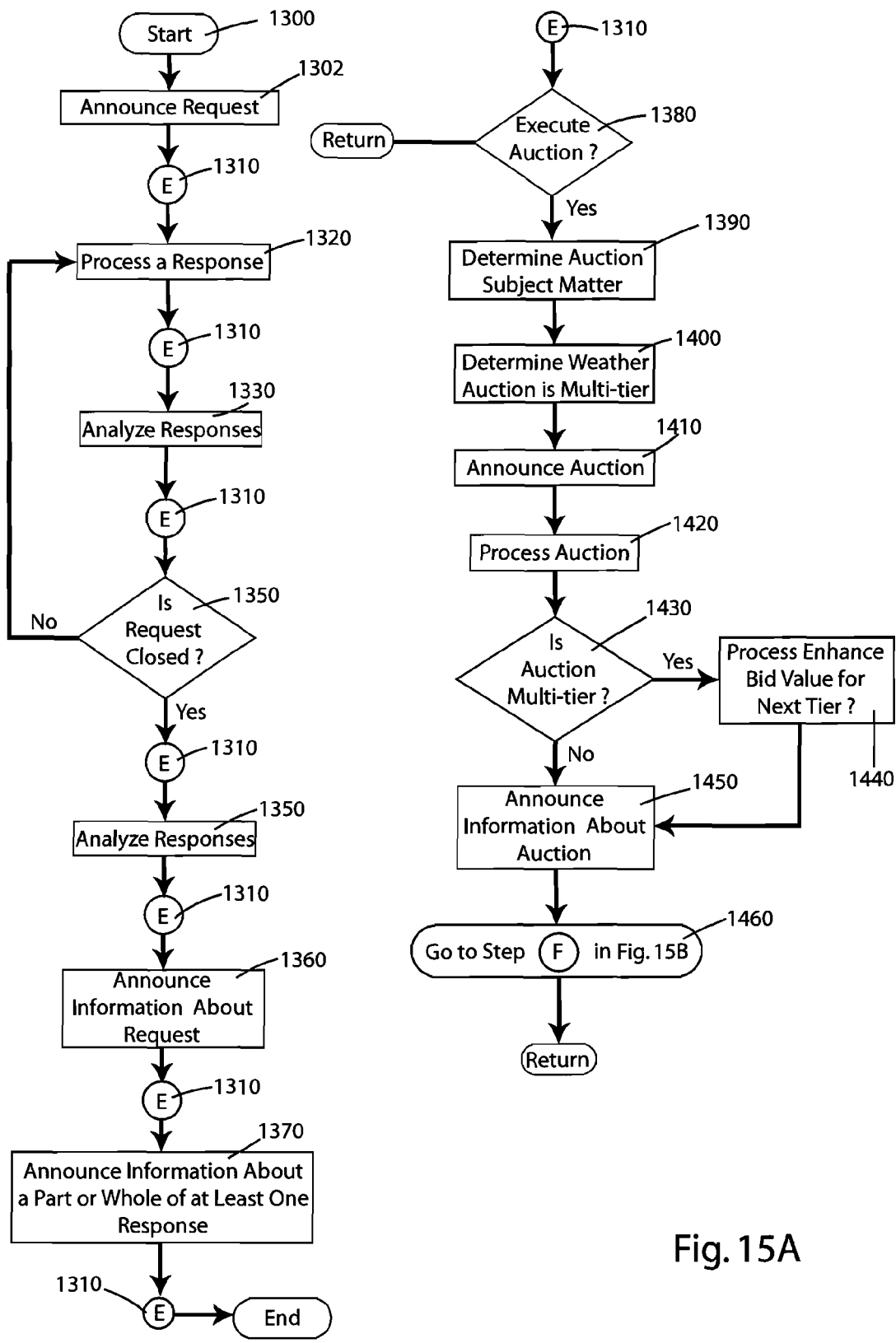
FIGS. 15A and 15B show flow charts of detailed processing flows for the web site for offering requests and executing auction transactions with various timing related to the processing steps of the request, sequences and combinations based on the value of the information concerning the request and/or response(s) to it.
Figure 15B:
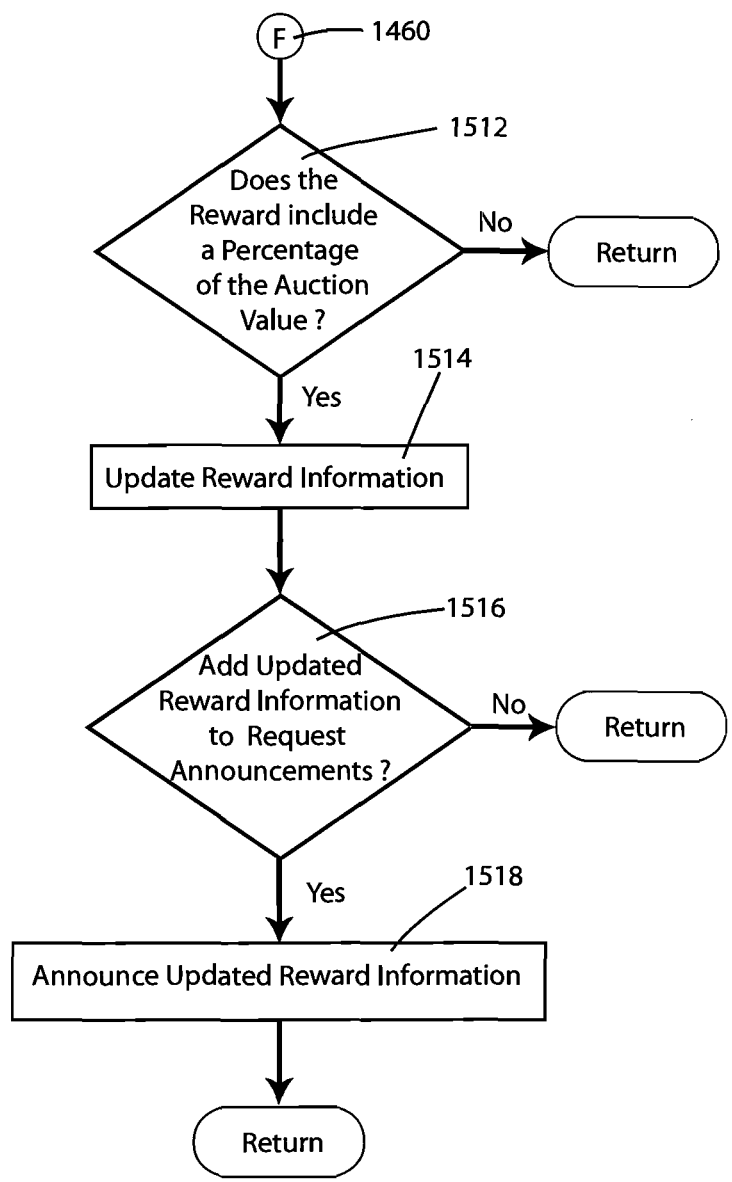

FIGS. 14A and 14B show an embodiment combining an investment strategy with a request 60. FIGS. 15A and 15B show an embodiment combining an auction strategy with a request. The steps of FIGS. 14A, 14B and 15A and 15B can be for combining any given request 60 with a financial transaction so that both investment and auction transactions can be executed in combination or sequentially or as determined based on the success of either component. For example, a successful auction upon announcement of a request 60 can demonstrate the interest for investors in the outcome of the request 60, increasing the probability that a prediction about market value after the announcement of the request 60 outcome will be realized, and similarly an investment profit will be realized. Also, if an investment profit is realized, and that information is made public, then the value of the responses 120 to the request 60 (even those non-winning responses) can increase, making an auction optimal to generate additional revenue for the searchers who respond to the request 60 and the web site 16 or other host. In addition, any increase in reward for the request 60 based on a revenue percentage of transactions, such as investments or auctions, will increase the incentive for searchers to identify relevant prior art, thereby increasing the research methodology. These components enrich one another. Any combination, any order or any absence of one component (e.g., auction or investment) as an overall strategy or for a given request that optimizes revenue streams for the web site 16 or host, or searchers who respond to requests, can be pursued and is within the scope of this invention. Further, in some embodiments, the reward need have only a fixed monetary amounts and the investment and auction component revenues can apply to the revenues of the web site 16 or host. In a further embodiment, all searchers who have won a finder's fee search over a period of time can participate in a percentage of profits of the web site 16 or host. In this manner, even where rewards are a fixed monetary amount, they can be fixed at a high enough amount to provide incentive to searchers, and searchers can be provided with revenue streams from the company or solely the fixed monetary rewards.

FIG. 14A begins (step 900) with an announcement of a request 60 (step 902). Response(s) are then processed (step 910), followed by an outcome being determined (step 920). In step 930, a potential investment is analyzed and then a decision is made as to whether to execute an investment (step 940). If the answer is yes, then an investment is executed (step 950). If the answer is no, then processing continues with a determination as to whether to sell information related to the request 60 or response(s) 120 (step 960). If the answer is yes, then the information is distributed (step 970, and a percentage of the revenue stream can be added to the reward, not shown). If the answer is no, then there is an announcement of information related to the request 60 or response(s) 120 (step 980) and processing then continues to step D (step 990). In step 1000, the investment outcome is analyzed. A determination is then made as to whether a reward should include a percentage of the value of the investment (step 1012). If the answer is no, then processing is returned and ended. If the answer is yes, then the reward information is updated (step 1014). A determination is then made as to whether to add the updated reward information to the request 60 announcement (step 1016). If the answer is yes, then the updated reward information is announced (step 1018). If the answer is no, then processing is returned and ended.

FIG. 14B adds steps 1102, 1110 and 1120 prior to step 1125. Step 1125 is the same as processing step 902 in FIG. 14A. The remaining steps in FIG. 14B, i.e., steps 1130, 1140, 1150, 1160, 1170, 1180, 1190 and 1200 are the same as FIG. 14A 902, 910, 920, 930, 940, 950, 960, 970 and 980 respectively. FIG. 14B steps 1102, 1110 and 1120 also are the same as FIG. 14A steps 930, 940 and 950, respectively. The description of all equivalent steps has been provided for FIG. 14A above. However, steps 1102, 1110 and 1120 occur before the announcement of a request 60 (step 1125) in the event that a prediction can be made that the announcement of a request 60 itself will have a market impact so that an investment should be executed prior to) such announcement of a request 60, (or just upon, just after or after a period of time from the announcement, to ensure full compliance with all U.S. and international legal and professional standards for finance, law etc., not shown.

FIG. 15A shows the processing of one or multiple auctions for a single request. It is triggered (step 1300) by the announcement of a request 60 (step 1302). Processing is then executed as Step E and a determination is made as to whether there is an auction opportunity (step 1380). If the answer is no, then processing is returned. If the answer is yes, then the subject matter of the auction is determined (step 1390). In one embodiment, the subject matter of an auction can be that the winning bidder participates in any investment related to information about the request 60 or response(s) 120. The processing then continues with a determination of whether the auction is multi-tier (step 1400), the auction is announced (step 1410) and processed (step 1420). A question is then addressed as to whether the auction is multi-tier (step 1430). If the answer is yes, then the enhanced bid value for the next tier of the auction is processed (step 1440). If the answer is no, then information about the auction is announced (step 1450). Processing is then triggered for Step F in FIG. 15B. Step F in FIG. 15B includes: a question as to whether the reward includes a percentage of the value of the auction (step 1512). If the answer is no, then processing is returned and ended. If the answer is yes, then the reward information is updated (step 1514). A determination is then made as to whether to add the updated reward information to the request 60 announcement (step 1516). If the answer is no, then processing is returned and ended. If the answer is yes, then the updated reward information is announced (step 1518). Processing is then returned and ended.

While there has been described herein the principle of the invention, it is to be clearly understood to those skilled in the art that this description is made only by way of example and not as a limitation to the scope of the invention. Accordingly, it is intended, by the appended claims, to cover all modifications of the invention that fall within the true spirit and scope of the invention.

What is claimed is:

1. A method for providing a monetized value of information, said method comprising the steps of:
   a. displaying on one or more displays coupled to a computer network for access by a plurality of information providers,
      i. an information request regarding at least one patent or at least one patent application, and
      ii. a description of compensation for at least one of said information providers who provides information responsive to said information request, wherein said compensation comprises a variable component that allows for compensation to vary;
   b. receiving, at one or more processors, at least one response from at least one of said information providers;
   c. receiving, at the one or more processors, a conclusion, said conclusion comprising whether said at least one response will affect the value of a financial instrument associated with the at least one patent or the at least one patent application;
   d. executing, via the one or more processors, based on the conclusion, a financial transaction, wherein said financial transaction comprises trading said financial instrument;
   e. displaying, via a display, said conclusion or information describing said conclusion on said computer network;
   f. receiving, at the one or more processors, an indication of profit or loss from said financial transaction; and
   g. determining and providing, via the one or more processors, said compensation for said at least one of said information providers, wherein said variable component is determined based on said profit from said financial transaction, wherein the amount of profit from the financial transaction provides said monetized value of said information.

2. The method according to claim 1, further comprising applying a percentage of said profit from said financial transaction to said variable component that allows for compensation to vary.

3. The method according to claim 1, wherein said compensation further comprises a fixed component.

4. The method according to claim 1, wherein said compensation comprises a fixed component and said fixed component is a minimum payment.

5. The method according to claim 1, wherein said at least one response comprises an identification of one or more prior art references and said information request is for prior art to the at least one patent or the at least one patent application.

6. The method according to claim 5, wherein said conclusion comprises that the at least one patent is valid or invalid or the at least one patent application is patentable or unpatentable over said one or more prior art references or said one or more prior art references in combination with another prior art reference.

7. The method according to claim 1, further comprising awarding of said profit being triggered by said conclusion or information describing said conclusion.

8. The method according to claim 1, wherein said financial transaction comprises the purchase of a security, the sale of a security, the purchase of a security on a public exchange, the sale of a security on a public exchange, the execution of a trade on a private market, the execution of a trade on a public market, the execution of a trade of a financial instrument, the purchase, sale or exercise of a stock option, a trade of derivative products or a trade of a security on a public exchange.

9. The method according to claim 1, wherein (d) occurs before (e), (e) occurs before (d) or (d) occurs generally at the same time as (e) and wherein said information provider who provides said information communicates with a host of said information request by telephone or using another electronic form than the computer network to provide said information responsive to said information request.

10. The method according to claim 1, wherein said information responsive to said information request is at least one prior art reference to the at least one patent or the at least one patent application.

11. The method according to claim 1, wherein said at least one response comprises evidence of patent infringement and said information request is for evidence of infringement of the at least one patent.

12. The method according to claim 11, wherein said information request is a request for information that the at least one patent is or is not valid.

13. The method according to claim 1, wherein said at least one response comprises one or more industry surveys or surveys of technologies.

14. The method according to claim 1, wherein said conclusion comprises that the at least one patent is valid or invalid, and further wherein, said at least one patent is owned by a entity holding securities which are publicly traded, and said financial transaction comprises the purchase or sale of stock or options in the securities of said entity or in a competitor of said entity, wherein said competitor holds securities that are publicly traded.

15. The method according to claim 1, wherein said information responsive to said information request is relevant to whether the at least one patent is valid or invalid or the at least one patent application is patentable or unpatentable, and further wherein, said patent is owned by a entity holding securities which are publicly traded, and said financial transaction comprises the purchase or sale of stock or options in the securities of said entity or in a competitor of said entity, wherein said competitor holds securities which are publicly traded.

16. The method according to claim 1, wherein the step of providing said compensation comprises describing to at least one person a dollar amount of said compensation, transmitting the dollar amount of said compensation, displaying over said computer network the dollar amount of said compensation or displaying over said computer network a description of said compensation.

17. The method according to claim 1, wherein if said at least one response which is said information responsive to said information request is received from two of said plurality of information providers, then said compensation further comprising being determined by being given to the provider who responded first.

18. The method according to claim 1, wherein said compensation is further related to income from selling said information responsive to said information request.

19. The method according to claim 1, wherein said compensation is further related to results of an auction of one, all, some or only non-winning responses, an auction of a right to receive advanced notice of whether said information responsive to said information request has been received or an auction of ownership of said information request including a determination of whether said information responsive to said information request has been received.

20. The method according to claim 19, wherein said auction is completed and a highest bid is determined prior to publicizing whether said information responsive to said information request has been received and wherein, said highest bid is received whether or not said information responsive to said information request is received.

21. The method according to claim 1, wherein said information request is a request for information as to a portion or a whole of a set of patent claims.

22. The method according to claim 1, wherein said information request is a request for information as to a description or illustration derived from a portion or whole of the at least one patent or the at least one patent application.

23. The method according to claim 1, wherein said information providers are limited to subscribers to an organization carrying out the method.

24. The method according to claim 23, further including the step of providing a reward to a person who refers the most subscribers to the organization in a given period of time.

25. The method according to claim 23, further including the step of providing a reward to any number of people who refer a predetermined number of subscribers to the organization.

26. The method according to claim 1 wherein said information request is a request for information about the ownership and coverage of the at least one patent or the at least one patent application in a particular field of technology, industry or relevant to a company or its competitors.

* * * * *